US010027499B2

(12) United States Patent
Hedayat

(10) Patent No.: US 10,027,499 B2
(45) Date of Patent: Jul. 17, 2018

(54) MULTI-USER AGGREGATION METHODS AND SYSTEMS FOR DATA AND CONTROL FRAMES

(71) Applicant: NEWRACOM, INC., Irvine, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 126 days.

(21) Appl. No.: 15/093,591

(22) Filed: Apr. 7, 2016

(65) Prior Publication Data

US 2016/0302229 A1    Oct. 13, 2016

Related U.S. Application Data

(60) Provisional application No. 62/296,369, filed on Feb. 17, 2016, provisional application No. 62/252,733, (Continued)

(51) Int. Cl.
*H04L 12/18* (2006.01)
*H04L 1/18* (2006.01)
(Continued)

(52) U.S. Cl.
CPC ....... *H04L 12/1868* (2013.01); *H04B 7/0452* (2013.01); *H04L 1/18* (2013.01);
(Continued)

(58) Field of Classification Search
CPC ..... H04L 12/1868; H04L 1/18; H04L 69/324; H04W 72/042
See application file for complete search history.

(56) References Cited

U.S. PATENT DOCUMENTS

2016/0165574 A1* 6/2016 Chu .................. H04L 5/0007
                                              370/312
2016/0165589 A1* 6/2016 Chu .................. H04L 5/0007
                                              370/329

OTHER PUBLICATIONS

LAN/MAN Standards Committee of the IEEE Computer Society, "IEEE P802.11ah™ /D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Ronald B Abelson
(74) *Attorney, Agent, or Firm* — McDermott Will & Emery LLP

(57) ABSTRACT

In an example of multi-user wireless communications, an access point may send a downlink frame, including a common information field and multiple per user information fields, to multiple stations. The common information field and the per user information fields are located in a payload section of the downlink frame. The common information field includes information common to all of the stations. Each per user information field may have information specific to its corresponding station. Some or all of the stations may generate and transmit their respective uplink frames based on the common information field and their respective per user information field(s) included in the downlink frame. The downlink frame may be a trigger frame such as a multi-user block acknowledgment request (MU BAR) frame. The uplink frames may be block acknowledgment or acknowledgment (BA or ACK) frames. Other methods, apparatus, and computer-readable media are also disclosed.

17 Claims, 12 Drawing Sheets

Related U.S. Application Data filed on Nov. 9, 2015, provisional application No. 62/206,769, filed on Aug. 18, 2015, provisional application No. 62/144,275, filed on Apr. 7, 2015.

(51) Int. Cl.
*H04L 29/08* (2006.01)
*H04W 72/04* (2009.01)
*H04B 7/0452* (2017.01)
*H04W 84/12* (2009.01)

(52) U.S. Cl.
CPC ......... *H04L 69/324* (2013.01); *H04W 72/042* (2013.01); *H04W 84/12* (2013.01)

(56) References Cited

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

\* cited by examiner

1210

DETERMINING A COMMON INFORMATION FIELD AND A PER USER INFORMATION FIELD WITHIN A RECEIVED DOWNLINK FRAME, WHEREIN THE COMMON INFORMATION FIELD AND THE PER USER INFORMATION FIELD ARE LOCATED IN A PAYLOAD SECTION OF THE RECEIVED DOWNLINK FRAME

GENERATING A MULTI-USER UPLINK FRAME BASED ON THE COMMON INFORMATION FIELD AND THE PER USER INFORMATION FIELD

TRANSMITTING THE MULTI-USER UPLINK FRAME BASED ON THE DOWNLINK FRAME AS PART OF THE MULTI-USER UPLINK TRANSMISSION WITH THE PLURALITY OF STATIONS

FIG. 12A

MULTI-USER AGGREGATION METHODS AND SYSTEMS FOR DATA AND CONTROL FRAMES

CROSS-REFERENCE TO RELATED APPLICATIONS

This application claims the benefit of priority from U.S. Provisional Application No. 62/144,275, entitled "MULTIUSER AGGREGATION METHODS FOR DATA AND CONTROL FRAMES," filed Apr. 7, 2015, U.S. Provisional Application No. 62/206,769, entitled "MULTIPLEXING RESPONSE FRAMES FOR MULTICAST SERVICES," filed Aug. 18, 2015, U.S. Provisional Application No. 62/252,733, entitled "MULTIPLEXING RESPONSE FRAMES FOR MULTICAST SERVICES." filed Nov. 9, 2015, and U.S. Provisional Application No. 62/296,369, entitled "MULTIPLEXING RESPONSE FRAMES FOR MULTICAST SERVICES," filed Feb. 17, 2016, all of which are incorporated herein by reference in their entirety.

TECHNICAL FIELD

The present description relates in general to wireless communication systems and methods, and more particularly to, for example, without limitation, multi-user aggregation methods and systems for data and control frames.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 12A through 12C illustrate flow charts of examples of multi-user aggregation methods for data and control frame operation.

Figure 1:
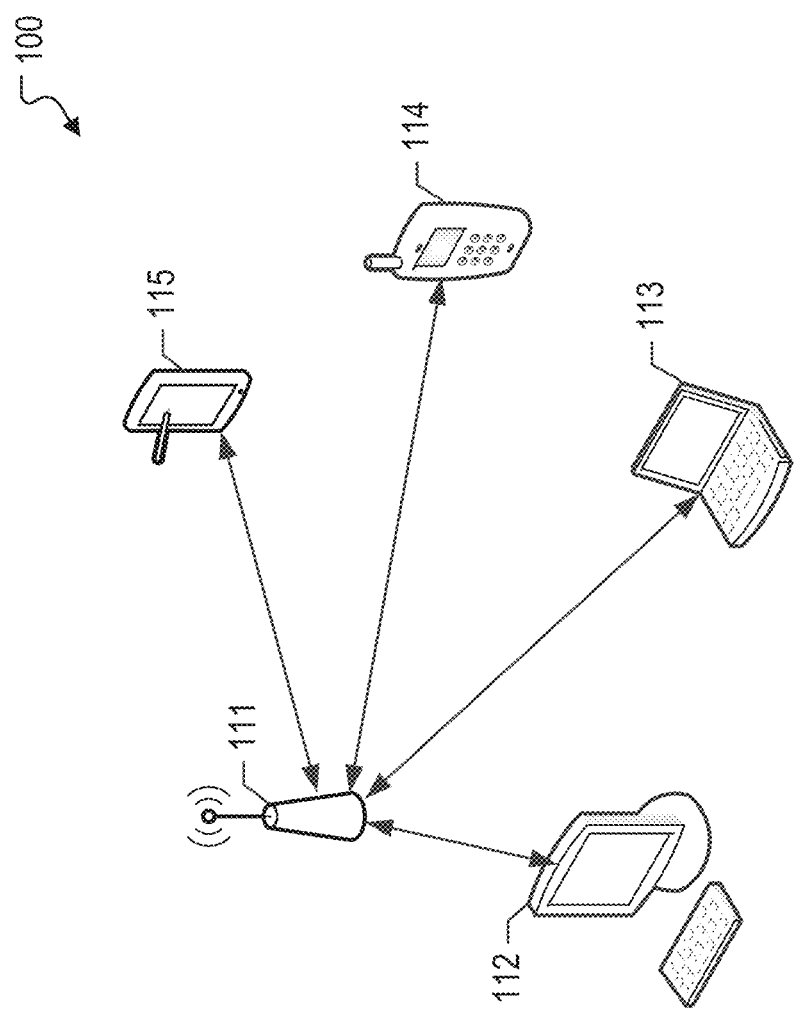
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

New multi-user (MU) transmissions, such as downlink (DL) orthogonal frequency division multiple access (OFDMA) and DL MU multiple-input/multiple-output (MIMO), provide new opportunities for next-generation WiFi technology. For example, OFDMA is a technique that can be used in WiFi technology in order to enhance the aggregation of multiple payloads that are destined to multiple stations (STAs) within the same frame. Due to this and other advantages, OFDMA technique is being considered for next generation WLAN technologies, including 802.1 lax which is also referred to as high efficiency (HE) technology.

With OFDMA technique, there comes new opportunities and challenges that should be considered in the design of OFDMA signaling and procedures. Among the opportunities that are provided by OFDMA is the frequency selectivity gain, where AP would allocate resources to each STA where those allocated resources offer highest frequency-gain for that STA. Using acknowledgement procedures, the access point (AP) can obtain the information that is needed to harvest frequency selectivity gain for each STA in the subsequent DL or uplink (UL) OFDMA frames. The present disclosure describes methods to aggregate several control or data frames for different recipients in a single PPDU. The present disclosure also introduces multiple embodiments that enable aggregation of multiple medium access control (MAC) protocol data units (MPDUs) in a PSDU. In one embodiment, multiple control frames are aggregated into a single frame, which is referred to as a "MU Control Wrapper frame." In another embodiment, multiple data frames that are destined to multiple recipients are aggregated into a single PPDU.

In some aspects, consider the situation where a first STA wants to poll several STAs, where the set of STAs are expected to send acknowledgment/block acknowledgment (ACK/BA) frames in response to the frames that have been sent previously but whose acknowledgment is not yet received by the first STA. In legacy systems, the first STA would poll each of the set of the STAs individually for ACK/BA response. While this approach may work, it has the disadvantage of many more frame exchanges that grow linearly with the size of the set of STAs. Additionally, for each frame exchange between the first STA and one STA from the set of STAs, there may be some medium contention involved. The present disclosure describes techniques for polling several STAs by a first STA, where the set of STAs are expected to send ACK/BA frames in response to the frames that have been sent previously but whose acknowledgment is not yet received by the first STA. This disclosure also describes methods that can be used between an AP and a set of STAs that receive unicast frames (either in single user (SU) or MU frames) or multicast frames (either in SU or MU frames) from the AP. This disclosure describes new methods to multiplex response frames from a set of STAs that participate in a multicast service.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a MAC layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP HE STA, and an AP refers to a HE AP. In one or more aspects, a STA may act as an AP.

Figure 2:
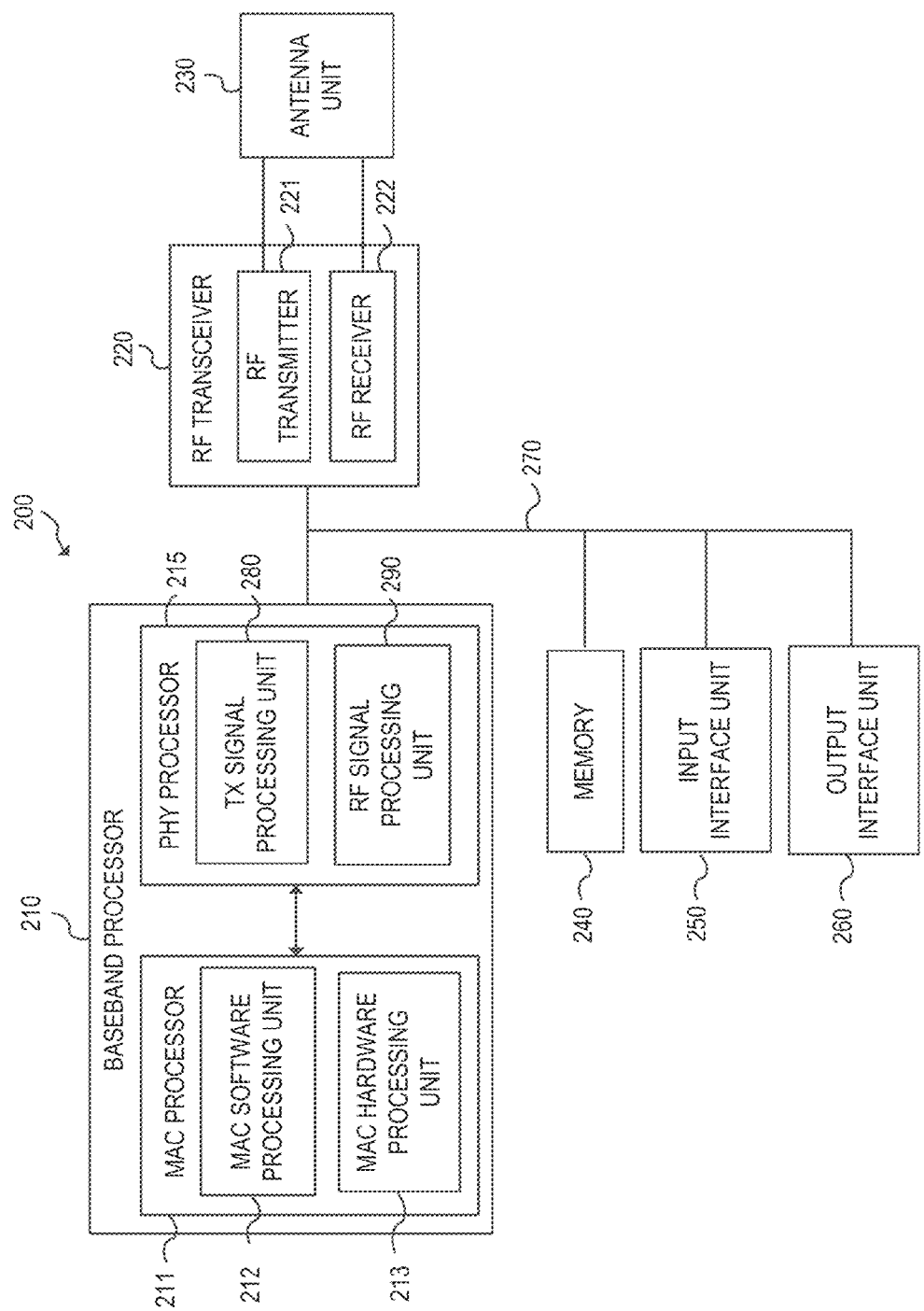
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
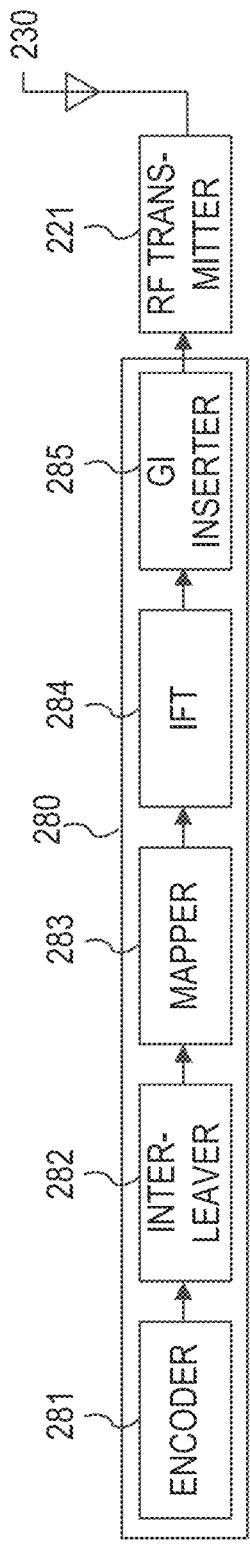
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
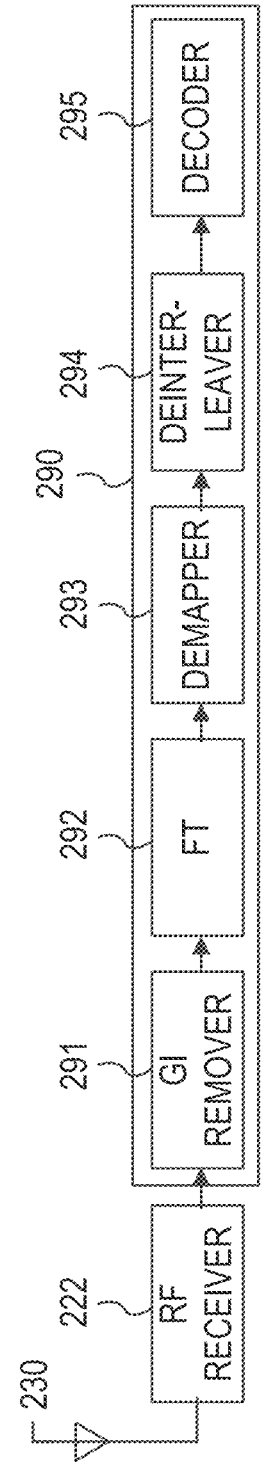
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
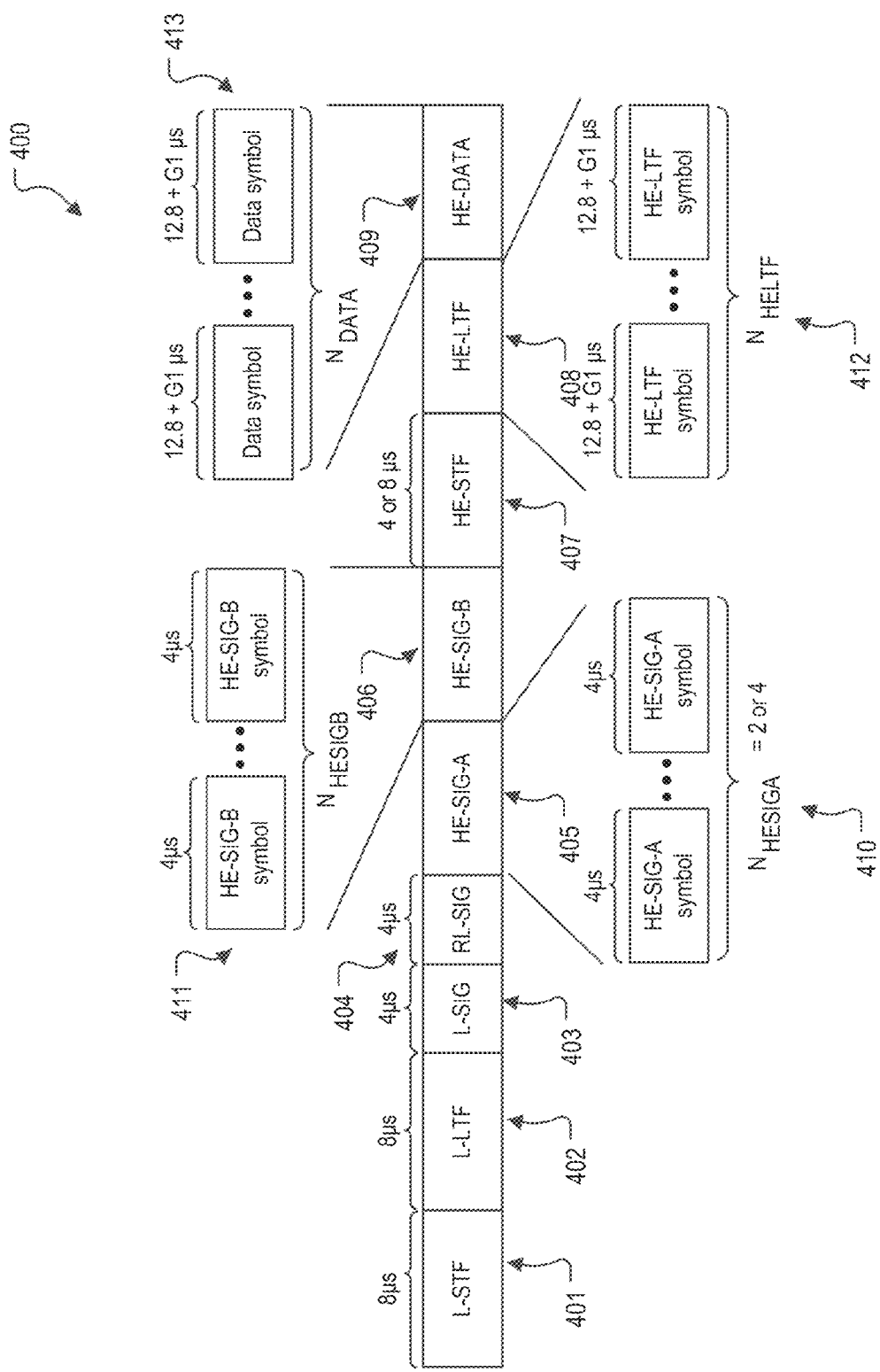
FIG. 4 illustrates a schematic diagram of an example of a format of a high efficiency (HE) physical layer convergence procedure (PLCP) protocol data unit (HE PPDU) frame.

FIG. 4 illustrates a schematic diagram of an example of a format of a high efficiency (HE) physical layer convergence procedure (PLCP) protocol data unit (HE PPDU) frame 400. A transmitting STA generates the PPDU frame 400 and transmits the PPDU frame 400 to a receiving STA. The receiving STA receives, detects, and processes the PPDU frame 400. The PPDU frame 400 includes an L-STF field 401, an L-LTF field 402, an L-SIG field 403, an RL-SIG field 404, an HE-SIG-A field 405, an HE-SIG-B field 406, an HE-STF field 407, an HE-LTF field 408, and an HE-DATA field 409. The HE-SIG-A field 405 includes $N_{HESIGA}$ symbols 410, the HE-SIG-B field 406 includes $N_{HESIGB}$ symbols 411, the HE-LTF field 408 includes $N_{HELTF}$ Symbols 412, and the HE-DATA field 409 includes $N_{DATA}$ symbols 413. Table 1, shown below, describes fields of the PPDU frame 400 in more detail.

TABLE 1

| | | PPDU Frame | | | | |
|---|---|---|---|---|---|---|
| Element | Definition | Duration | DFT period | GI | Subcarrier Spacing | Description |
| Legacy (L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |

TABLE 1-continued

| | | | PPDU Frame | | | |
|---|---|---|---|---|---|---|
| Element | Definition | Duration | DFT period | GI | Subcarrier Spacing | Description |
| HE-SIG-A | HE SIGNAL A field | $N_{HESIGA} * 4$ μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB} * 4$ μs | 3.2 μs | 0.8 μs | 312.5 kHz | $N_{HESIGb}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |

TABLE 1-continued

PPDU Frame

| Element | Definition | Duration | DFT period | GI | Subcarrier Spacing | Description |
|---|---|---|---|---|---|---|
| HE-LTF | HE Long Training field | $N_{HELTF}$ * (DFT period + GT) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | $N_{DATA}$ means the number of HE data symbols. |

Figure 5:
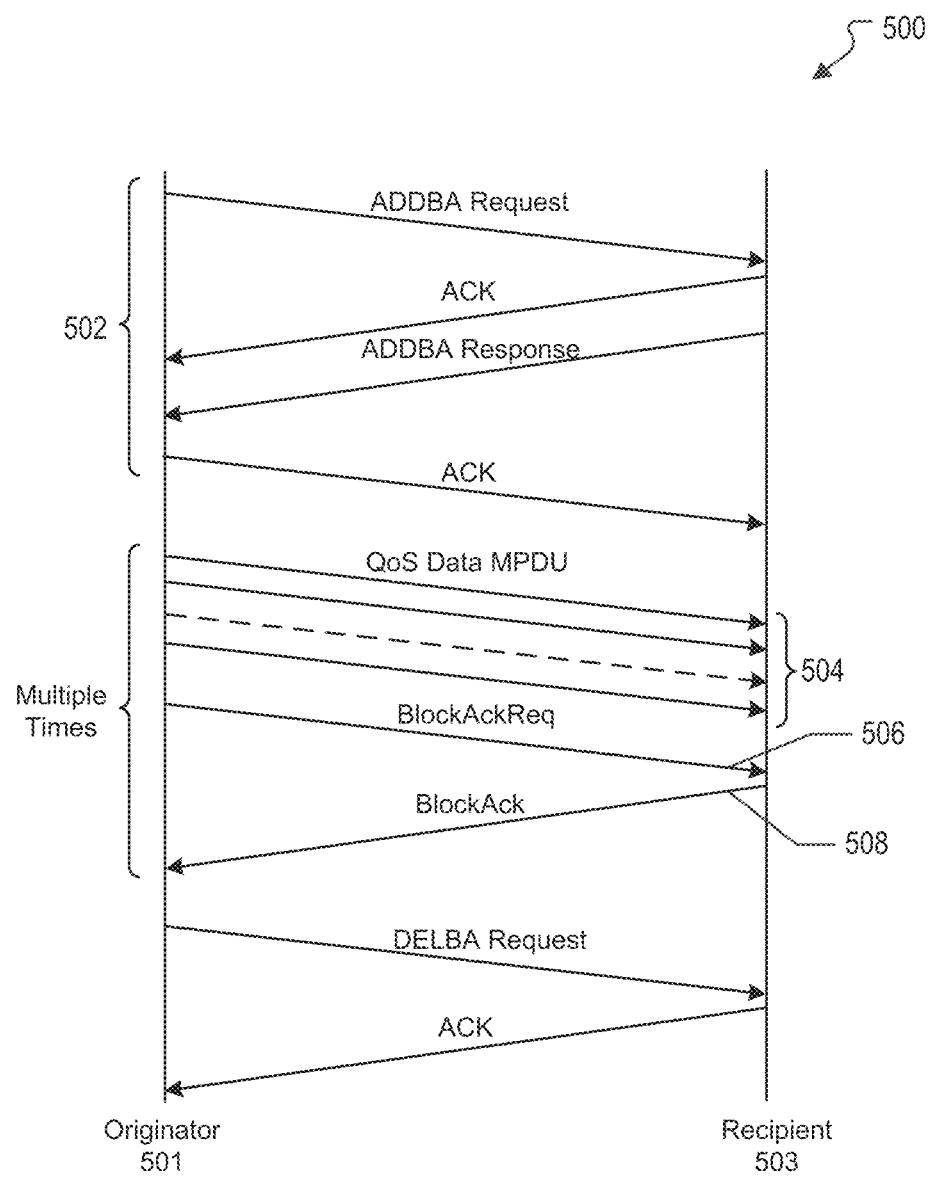
FIG. 5 illustrates a schematic diagram of an example of a request and acknowledgment exchange mechanism related to a block acknowledgment mechanism.

FIG. 5 illustrates a schematic diagram of an example of a request to establish a block acknowledgment exchange mechanism and subsequently transmit data, a block acknowledgment request, and block acknowledgment frames. Note that an ACK frame is sent to acknowledge the successful reception of a frame by a recipient (e.g., STA2). In one or more implementations, a recipient (e.g., STA2) sends a frame referred to as a block acknowledgment (Block Ack, BlockAck or BA) to acknowledge the successful reception of multiple consecutive frames at once. In this example, a Block Ack mechanism improves channel efficiency by aggregating several acknowledgments into one frame. There are two types of Block Ack mechanisms: immediate and delayed. Immediate Block Ack is suitable for high-bandwidth, low-latency traffic while the delayed Block Ack is suitable for applications that tolerate moderate latency. In FIG. 5, the STA with data to send using the Block Ack mechanism is referred to as the originator 501, and the receiver of that data as the recipient 503.

The Block Ack mechanism is initialized by an exchange of add block acknowledgment (ADDBA) Request/Response frames 502. After initialization, blocks of quality-of-service (QoS) data frames 504 may be transmitted from the originator 501 (e.g., a STA such as an AP) to the recipient 503 (e.g., a STA). A block may be initiated within a polled transmission opportunity (TXOP) or by winning an enhanced distributed channel access (EDCA) contention. The number of frames in the block may be limited, and the amount of state that is to be kept by the recipient may be bounded. The MPDUs within the block of frames are acknowledged by a BlockAck frame 508, which is requested by a BlockAckReq frame 506. The Block Ack mechanism does not require the setting up of a traffic stream (TS); however, QoS STAs using the TS facility may choose to signal their intention to use the Block Ack mechanism for the scheduler's consideration in assigning TXOPs. Acknowledgments of frames belonging to the same traffic identifier (TID), but transmitted during multiple TXOPs, may also be combined into a single BlockAck frame 508. The Block Ack mechanism allows the originator 501 to have flexibility regarding the transmission of data MPDUs. The originator 501 may split the block of frames across TXOPs, separate the data transfer and the Block Ack exchange, and interleave blocks of MPDUs carrying all or part of MAC service data units (MSDUs) or aggregate MSDUs (A-MSDUs) for different TIDs or receiving station addresses (RAs).

The ADDBA Request and ADDBA Response frames (e.g., 502) are used to set up or to modify Block Ack operation for a specific TC, TS, or Group-Cast with Retry (GCR) group address. A Block Ack Action field, in the octet immediately after the Category field, differentiates the Block Ack Action frame formats. The Block Ack Action field values associated with each frame format within the Block Ack category are defined in Table 2 below (Block Ack Action field values).

TABLE 2

Block Ack Action Field Values

| Block Ack Action Field Values | Meaning |
|---|---|
| 0 | ADDBA Request |
| 1 | ADDBA Response |

TABLE 2-continued

Block Ack Action Field Values

| Block Ack Action Field Values | Meaning |
|---|---|
| 2 | DELBA |
| 3-255 | Reserved |

An ADDBA Request frame (e.g., 502) is sent by an originator (e.g., 501) of block ack to another STA (e.g., 503). The Action field of an ADDBA Request frame contains the information shown in Table 3 below (ADDBA Request frame Action field format).

TABLE 3

ADDBA Request Frame Action Field Format

| Order | Information |
|---|---|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address Element (optional) |
| 8 | Multi-band (optional) |
| 9 | TCLAS (optional) |
| 10 | ADDBA Extension (optional) |

The Category field is defined in Section 8.4.1.11 (Action field) of the IEEE 802.11 Specification, under Management and Extension Frame Body Components, which is incorporated herein in its entirety (802.11 Specification). The Block Ack Action field is defined in Section 8.6.5.1 (General) of the 802.11 Specification. The Dialog Token field is set to a nonzero value chosen by the STA. The Block Ack Parameter Set field is defined in Section 8.4.1.14 (Block Ack Parameter Set field) of the 802.11 Specification. The Block Ack Timeout Value field is defined in Section 8.4.1.15 (Block Ack Timeout Value field) of the 802.11 Specification. The Block Ack Starting Sequence Control field is defined in Section 8.3.1.8 (BlockAckReq frame format) of the 802.11 Specification. If the GCR Group Address element is present, the TID field within the Block Ack Parameter Set field is reserved. The GCR Group Address element contains the group address for which a block ack agreement is requested. When present in an ADDBA Request frame, the Multi-band element indicates the frequency band, operating class, and channel number to which the ADDBA Request frame applies and contains band-specific information. The ADDBA Extension element is defined in Section 8.4.2.138 (ADDBA Extension element) of the 802.11 Specification.

The ADDBA Response frame is sent in response to an ADDBA Request frame. The Action field of an ADDBA Response frame contains the information shown in Table 4 below (ADDBA Response frame Action field format).

TABLE 4

ADDBA Response Frame Action Field Format

| Order | Information |
|---|---|
| 1 | Category |
| 2 | Block Ack Action |
| 3 | Dialog Token |
| 4 | Status Code |
| 5 | Block Ack Parameter Set |

TABLE 4-continued

ADDBA Response Frame Action Field Format

| Order | Information |
|---|---|
| 6 | Block Ack Timeout Value |
| 7 | GCR Group Address Element (optional) |
| 8 | Multi-band (optional) |
| 9 | TCLAS (optional) |
| 10 | ADDBA Extension (optional) |

The Category field is defined in Section 8.4.1.11 (Action field) of the 802.11 Specification. The Block Ack Action field is defined in Section 8.6.5.1 (General) of the 802.11 Specification. The Dialog Token field value is copied from the corresponding received ADDBA Request frame. The Status Code field is defined in Section 8.4.1.9 (Status Code field) of the 802.11 Specification. The Block Ack Parameter Set field is defined in Section 8.4.1.14 (Block Ack Parameter Set field) of the 802.11 Specification. The Block Ack Timeout Value field is defined in Section 8.4.1.15 (Block Ack Timeout Value field) of the 802.11 Specification. If the GCR Group Address element is present, the TID field within the Block Ack Parameter Set field is reserved. The GCR Group Address element contains the group address for which a block ack agreement is requested. When present in an ADDBA Response frame, the Multi-band element indicates the frequency band ID, operating class, and channel number to which the ADDBA Response frame applies and contains band specific information.

The DELBA frame is sent by either the originator of the traffic (e.g., 501) or the recipient (e.g., 503) to terminate the block ack participation. The Action field of a DELBA frame format contains the information shown in Table 8-289 (DELBA frame Action field format) of the 802.11 Specification. The Category field is defined in Section 8.4.1.11 (Action field) of the 802.11 Specification. The Block Ack Action field is defined in Section 8.6.5.1 (General) of the 802.11 Specification. The DELBA Parameter Set field is defined in Section 8.4.1.16 (DELBA Parameter Set field) of the 802.11 Specification. The Reason Code field is defined in Section 8.4.1.7 (Reason Code field) of the 802.11 Specification. The DELBA GCR Group Address field is defined in 8.4.2.125 (GCR Group Address element) of the 802.11 Specification and contains the GCR group address whose block ack agreement is being terminated. When present in an DELBA frame, the Multi-band element indicates the frequency band, operating class, and channel number to which the DELBA frame applies.

Figure 6A:
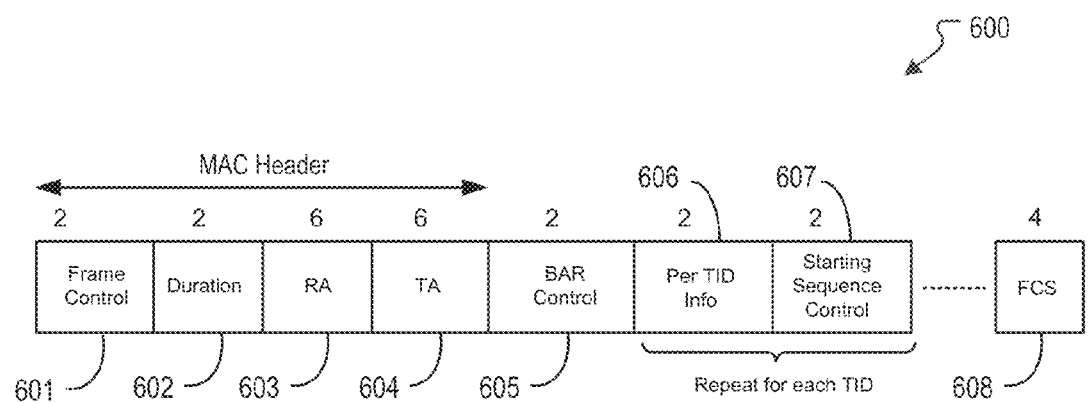
FIGS. 6A-6B illustrate examples of block acknowledgment request (BAR) frames and components.
Figure 6B:
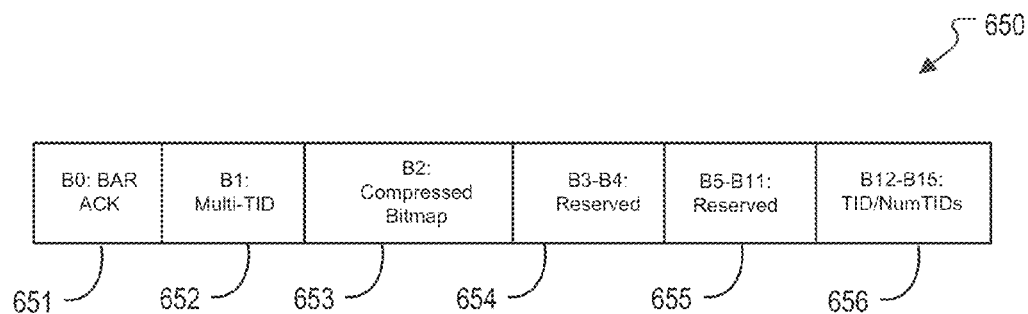

FIGS. 6A-6B illustrate schematic diagrams of examples of medium access control (MAC) layer frame formats. In one aspect, a MAC processor 211 generates the frames shown in these figures. In one aspect, each of the frames in FIGS. 6A-6B is a frame format for downlink. In one aspect, FIGS. 6A-6B illustrate examples of block acknowledgment request frames and components.

In FIG. 6A, a schematic diagram of an example of a block acknowledgment request (BAR) frame and underlying components is illustrated. The BAR frame 600 includes a frame control field 601, a duration field 602, a RA field 603, a transmitting station address (TA) field 604, a BAR control field 605, a per TID information field 606, a starting sequence control field 607 and a frame check sequence (FCS) field 608. In some aspects, the per TID information field 606 and the starting sequence control field 607 is repeated for each TID. In some aspects (for example, for Multicast Services and GCR services), the combination of the per TID information field 606 and the starting sequence control field 607 is referred to as the BAR information field.

In FIG. 6B, a schematic diagram of an example of a BAR control field and underlying components is illustrated. A BAR control field 650 is present within a BAR frame 600. The BAR control field 650 includes a BAR ACK field (or a BAR ACK policy field) 651, a multi-TID field 652, a compressed bitmap field 653, a first reserved field 654, a second reserved field 655 and a TID/NumTIDs field 656. The BAR ACK policy field 651 may be set to a value "0" or "1." In one aspect, the value "0" instructs a recipient to return an acknowledgment, and the value "1" is set when the originator does not require immediate acknowledgment.

Figure 7A:
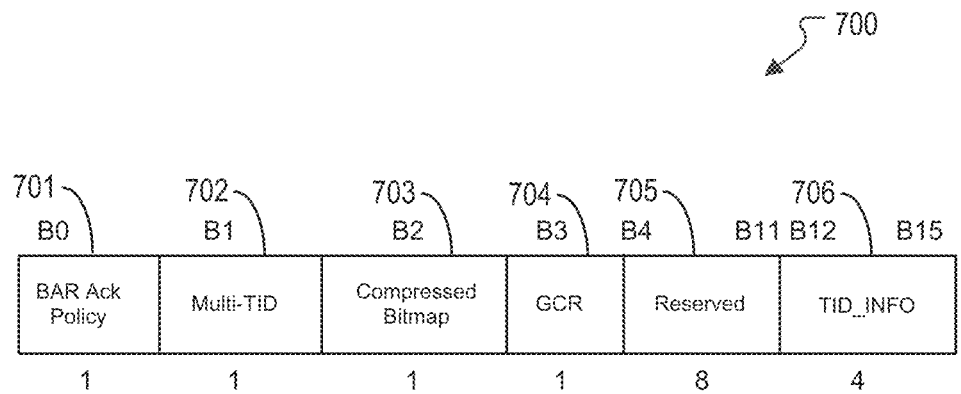
FIGS. 7A-7B illustrate examples of a BAR control field format and a BAR information field format for a BAR frame.
Figure 7B:
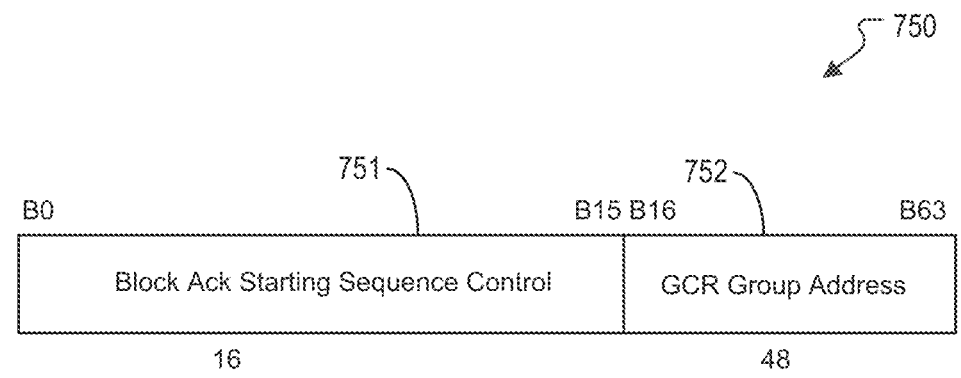

FIGS. 7A-7B illustrate examples of a BAR control field format and a BAR information field format for a BAR frame (e.g., 600 of FIG. 6A) for Multicast Services and GCR services. In some aspects, the BAR frame is a GCR BAR frame (or GCR BlockAckReq frame). In FIG. 7A, a schematic diagram of another example of a BAR control field 700 and underlying components is illustrated. The BAR control field 700 is present within a BAR frame 600 in some embodiments. The BAR control field 700 includes a BAR ACK subfield (or a BAR ACK policy subfield) 701, a multi-TID subfield 702, a compressed bitmap subfield 703, a GCR subfield 704, a reserved subfield 705 and a TID information subfield 706.

In FIG. 7A, the TID information (TID_INFO) subfield 706 of the BAR Control field 700 of the GCR BlockAckReq frame (e.g., 600) is set to 0. In FIG. 7B, the BAR Information field (e.g., 606 and 607) of the GCR BlockAckReq frame (e.g., 600) contains the Block Ack Starting Sequence Control subfield 751 and the GCR Group Address subfield 752 (BAR Information field format (GCR BlockAckReq)). The Starting Sequence Number subfield of the Block Ack Starting Sequence Control subfield 751 contains the sequence number of the first MSDU or A-MSDU for which the corresponding BlockAckReq frame is sent. The Fragment Number subfield of the Block Ack Starting Sequence Control subfield 751 is set to 0. The GCR Group Address subfield 752 contains the MAC address of the group for which reception status is being requested.

The procedures explained above are carried in OFDM frames, based on the 802.11 Specification. On the other hand, OFDMA is a technique that can be used in WiFi technology in order to enhance the aggregation of multiple payloads that are destined to multiple STAs within the same frame. Due to this and other advantages, the OFDMA technique is now being considered for next generation WLAN technologies, including 802.1 lax which is also referred to as high efficiency (HE) technology. In below descriptions, for sake of completeness and brevity, we refer to OFDMA-based 802.11 technology and by a STA we refer to a non-AP HE STA and by AP we refer to a HE AP.

Figure 8:
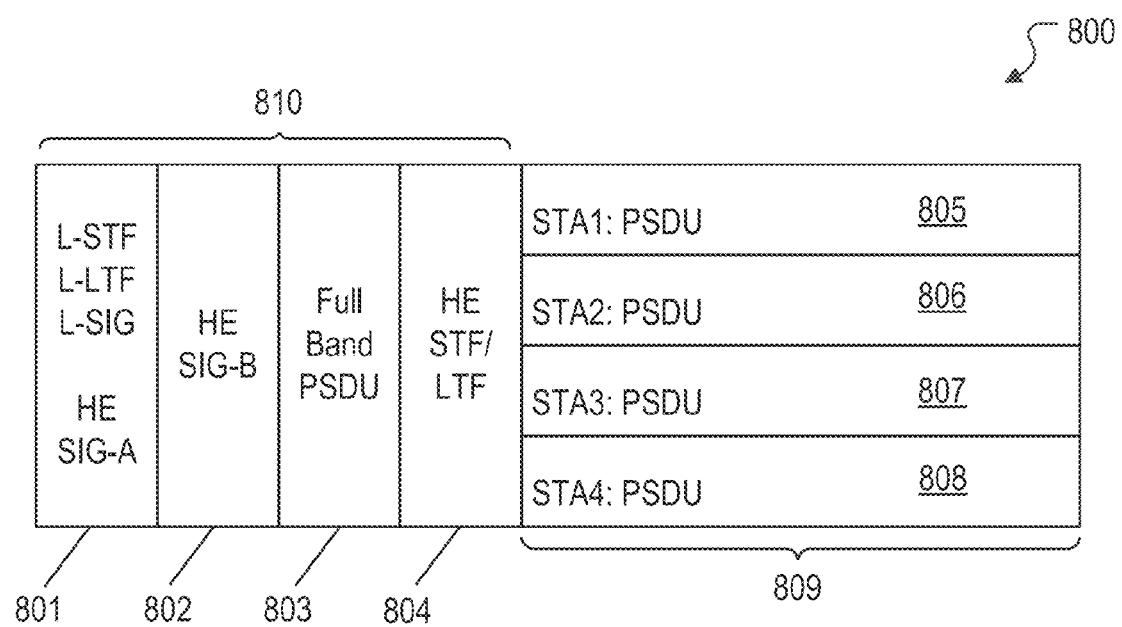
FIG. 8 illustrates a schematic diagram of an example of a downlink (DL) OFDMA PPDU transmission to a set of stations (STAs).

FIG. 8 illustrates a schematic diagram of an example of a downlink (DL) OFDMA PPDU transmission to a set of stations (STAs).

In one aspect, a DL OFDMA PPDU (e.g., 800) includes a header (e.g., 810) and a payload (e.g., 809). In one or more aspects, an AP sends a DL OFDMA frame (e.g., 800) in a HE PPDU format to a set of STAs. In one aspect, a baseband processor 210 (e.g., a PHY processor 215 or a TX signal processing unit 280) generates a DL frame and its components shown in FIG. 8 and causes transmission of the DL frame. In response to a DL frame, one or more STAs may respond with a uplink (UL) frame, which may include a header and a payload. An UL frame may have some of the fields shown in FIG. 4 or 8 (e.g., some of the fields in a header and a payload).

In one aspect, a downlink frame may refer to a DL OFDMA frame, a HE DL OFDMA frame, a DL OFDMA PPDU, a HE DL OFDMA PPDU, a DL PPDU, an MU BAR frame, or vice versa. In one aspect, an uplink frame may refer to a UL OFDMA frame, a HE UL OFDMA frame, a UL OFDMA PPDU, a HE UL OFDMA PPDU, a UL PPDU, an MU ACK frame, an MU ACK PPDU, a BA frame, or vice versa. In one aspect, a PPDU refers to a HE PPDU or an OFDMA PPDU. In one aspect, a PPDU is a downlink frame or an uplink frame. In one aspect, a frame may be a PPDU, one or more MPDUs, or one or more PSDUs.

In FIG. 8, the horizontal dimension represents the time dimension or number of OFDM symbols, whereas the vertical dimension represents the frequency dimension, number of tones, or number of sub-carriers. Note that for a given FFT size, the number of tones is given, however, depending on the sub-carrier spacing, two OFDM symbols with e.g., FFT=64 and FFT=256 would occupy the same bandwidth. In one or more implementations, a sub-band refers to a set of contiguous tones or subcarriers that as a whole are assigned for a payload whose expected destination is a single STA, or a set of STAs. In one or more implementations, a sub-band is a horizontal partition of an OFDMA PPDU or frame where a set of contiguous tones for a contiguous set of OFDM symbols are designated for a given payload whose expected destination is a STA or a set of STAs.

A DL OFDMA PPDU may have a predetermined channel bandwidth, e.g., 20 MHz, 40 MHz, 80 MHz, 160 MHz, or 80+80 MHz (i.e., two 80 MHz). A sub-band is a portion of the channel bandwidth of an OFDMA PPDU. For example, when the bandwidth of a PPDU is 20 MHz, and there are four STAs, each of the sub-bands associated with a respective one of the STAs is 8 MHz in bandwidth. When the bandwidth is 40 MHz, each of the four sub-bands associated with a respective one of the four STAs may be 10 MHz in bandwidth. When the bandwidth is 80 MHz, each of the four sub-bands associated with a respective one of the four STAs may be 20 MHz in bandwidth. These are merely examples, and the present disclosure is not limited to these examples. A bandwidth (e.g., 20 MHz, 40 MHz, 80 MHz, 160 MHz, or 80+80 MHz) of a PPDU may be referred to as a PPDU bandwidth, a channel bandwidth, or an overall bandwidth. A bandwidth may refer to a DL bandwidth or a UL bandwidth.

In one aspect, a header is referred to as a preamble header, a preamble, a header section, a header field, or vice versa. For the sake of brevity, a header may refer to a component of a header. Thus, in one aspect, a header may refer to one or more headers (e.g., 801, 802, 803, and/or 804).

Referring to FIG. 8, the header 810 of the DL frame 800 includes a legacy header, which is comprised of a legacy short training field (L-STF), a legacy long training field (L-LTF) and a legacy signal (L-SIG) field (see, e.g., portions of 801). The legacy header contains several symbols based on an early design of an IEEE 802.11 specification. Presence of these symbols would make any new design compatible with the legacy designs and products. In one or more implementations, the legacy STF, LTF and SIG symbols are modulated/carried with FFT size of 64 on a 20 MHz sub-channel and are duplicated every 20 MHz if the PPDU has a bandwidth wider than 20 MHz. Therefore, the legacy field (i.e., the STF. LTF, and SIG fields) occupies the entire channel bandwidth of the DL frame.

In one or more aspects, the header 810 includes a HE SIG-A field (e.g., a portion of 801) and a HE SIG-B field (e.g., 802). These fields contain symbols that carry control information that may be vital regarding each PLCP service data unit (PSDU) and/or regarding the radio frequency (RF), PHY and MAC properties of the PPDU. Several fields may be located either in HE SIG-A and/or HE SIG-B. The HE SIG-A and HE SIG-B symbols may be carried/modulated using a FFT size of 64 or 256 depending on implementation. The HE SIG-A and HE SIG-B fields may occupy the entire channel bandwidth of a PPDU. In some aspects, the HE SIG-B is not always present in all UL OFDMA PPDUs.

The header 810 may further include HE STF and HE LTF fields (e.g., 804), which contain symbols used to perform necessary RF and PHY processing for each PSDU and/or for the whole PPDU. The HE STF/LTF symbols 804 may be modulated/carried with FFT size of 256 and modulated over the entire bandwidth of the DL frame 800. The HE STF/LTF fields may occupy the entire channel bandwidth a PPDU.

The header 810 of the DL frame 800 may include a full-band transmission region, referred to as a full-band physical layer convergence procedure (PLCP) service data unit (PSDU) 803 for unicast or broadcast/multicast PSDU(s), which exist for DL OFDMA PPDUs. In one aspect, the full-band PSDU 803 is an optional region in the DL OFDMA PPDU 800. The full-band PSDU 803 may have a variable length. The full-band PSDU 803 is a region having a set of symbols that covers the whole channel bandwidth of the PPDU but across several OFDM symbols before the start of the sub-band region where each one or multiple sub-bands are assigned to a STA or a set of STAs. In one aspect, if the full-band PSDU 803 is present in the PPDU (e.g., as a part of the header 810), a set of HE STF and/or HE LTF symbols may appear before the full-band PSDU 803 in the PPDU, where the HE STF/LTF symbols are not beamformed. In some aspects, the full-band PSDU 803 can be carried/modulated using FFT size of 64 or 256 depending on implementation. For example, the full-band PSDU 803 may be carried/modulated using FFT size of 64 as SIG-A, or carried/modulated using FFT size of 256 as the sub-band PSDU(s) region. The full-band PSDU 803 may occupy the entire channel bandwidth of the DL frame.

In FIG. 8, the payload section 809 includes payloads (e.g., PSDUs) assigned to multiple STAs, and is modulated using an FFT size of 256. In this regard, the payloads are associated with STA1, STA2, STA3, and STA4. For example, the PSDU payload 805 is associated with STA1, the PSDU payload 806 is associated with STA2, the PSDU payload 807 is associated with STA3, and the PSDU payload 808 is associated with STA4. In one aspect, each set of sub-bands is associated with its respective PSDU. In one aspect, each set of sub-bands is associated with its respective STA. In one aspect, a set of sub-bands may include one or more sub-bands. In one aspect, a sub-band may include one or more sub-bands. In one example, the number of assigned sets of sub-bands may be the same as the number of STAs associated with the AP. In FIG. 8, the sub-bands assigned to STA1, STA2, STA3, and STA4 have equal bandwidth and the sub-bands are contiguous. For example, the bandwidth of the DL frame may be (a) 20 MHz where each of the sub-bands has a 8 MHz bandwidth, (b) 40 MHz where each of the sub-bands has a 10 MHz bandwidth, or (c) 80 MHz where each of the sub-bands has a 20 MHz bandwidth. However, the procedure described in the present disclosure does not require contiguous or equal bandwidth for sets of assigned sub-bands.

A PSDU for downlink (e.g., each of 805, 806, 807, and 808) is associated with a sub-band of the channel bandwidth of the DL PPDU (e.g., 800) and is modulated using the sub-band rather than the entire channel bandwidth of the DL PPDU. In one aspect, the modulation involves inverse Fourier transformation performed, for example, by an inverse Fourier transformer 284 in FIG. 3A. In one or more aspects, the bandwidth assigned to payloads (e.g., 805, 806, 807 and 808) to STAs depend on, for example, the payload size and the MCS and number of spatial streams that the AP decides for the sub-band transmission, and the overall consideration that the AP need to make to approximately align the length/duration of various PSDU sub-bands.

In one or more implementations, each PSDU contains a payload directed to a STA including corresponding MAC/PHY padding. The broadcast PSDU(s), located in the full-band PSDU region 803, are intended for all the STAs that are associated with the AP. The presence and length of such PSDU(s) are indicated in the HE SIG-A field (see, e.g., a portion of 801) and/or the HE SIG-B field 802. The multicast PSDU(s), located in the full-band PSDU 803, are intended for a set of STAs that are associated with the AP. The presence and length of such PSDU(s) and the set of STAs that each multicast PSDU is destined to is indicated in the HE SIG-A field and/or the HE SIG-B field. The unicast PSDU(s), typically located in the sub-band region of a PPDU (e.g., in the payload 809), are destined to a STA that is associated with the AP. The presence and length of a PSDU in a sub-band or a set of sub-bands and the STA that is a recipient of the unicast PSDU are indicated in the HE SIG-A field and/or the HE SIG-B field. In one aspect, one or more of unicast PSDU(s) may be located in the full-band PSDU 803 and the rest of the unicast PSDU(s) are present in the sub-band PSDU 809.

Figure 9:
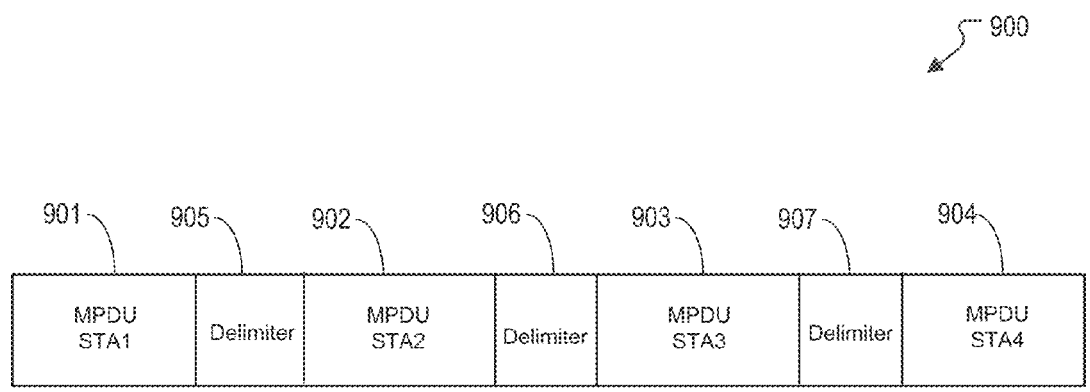
FIG. 9 illustrates an example of a first format for a multi-user aggregated medium access control protocol data unit (MU AMPDU).

FIG. 9 illustrates an example of a first format for an MU aggregated MPDU (MU AMPDU) 900, which may be included in a DL PPDU destined to a set of STAs. In order to avoid PHY and channel access overhead, AMPDU (or A-MPDU) procedure allows for aggregation of multiple MPDUs that are destined to the same STA and are for the same access category (AC). An AMPDU fits in a single PSDU, hence the PHY attributes (such as MCS, NSS, GI, . . . ) are the same for each MPDU.

The present disclosure describes herein methods to aggregate multiple MPDUs that are destined to multiple STAs in the DL direction. These methods are described at length below and denoted by multiuser aggregated MPDU or for short MU AMPDU.

The first method and format to aggregate is to aggregate MPDUs for various STAs by adding each MPDU (e.g., 902, 903, 904) after another MPDU (e.g., 901, 902, 903) with an "MPDU delimiter" in between (e.g., 905, 906, 907). In an aspect, an "MPDU delimiter" has 4 bytes length where 12 bits of it indicates the length of the MPDU that follows and 8 bits is used for CRC, 8 bits is used for signature, and four bits are reserved. Note that the 8-bit CRC covers the length field and the reserved bits. The signature is a fixed content that is used across all the devices that implement MU AMPDU. Note that this signature is not necessarily the same as the signature that is used for AMPDU. Since each MPDU has a MAC header, it has fields that can independently be set from one MPDU to another MPDU. However, some of these fields may be set the same across all MPDUs that are present in an MU AMPDU. In some implementations, the sub-type may be set to a new sub-type that indicates the frame is an MU AMPDU. The following shows the setting of MAC header fields across MPDUs that are present in an MU AMPDU:

1) The address fields (Address 1, 2, 3 and 4) in each MPDU are set as if each MPDU is transmitted regardless of MU AMPDU structure,
2) The Type subfield in the Frame Control (e.g., 601 of FIG. 6A) of each MPDU is set to appropriate Management (00), Control (01) or Data (10) types. Note that MU AMPDU may aggregate MPDUs with different types, where for instance, the AP aggregate Management and Data frames for the same or different STAs.
3) The Sub-type subfield in the Frame Control (e.g., 601) of each MPDU is set to a sub-type according to the content of the each MPDU.
4) The value that is indicated in the Duration field (e.g., 602 of FIG. 6A) of each MPDU is the same as the value across all MPDUs in the MU AMPDU (whenever the Duration field indicates the NAV value, but not the AID).
5) If there multiple QoS Control fields in MU AMPDU, bits 4 and 8-15 of these QoS Control fields may be identical.
6) Other fields and sub-fields are set for each MPDU independently.

Figure 10:
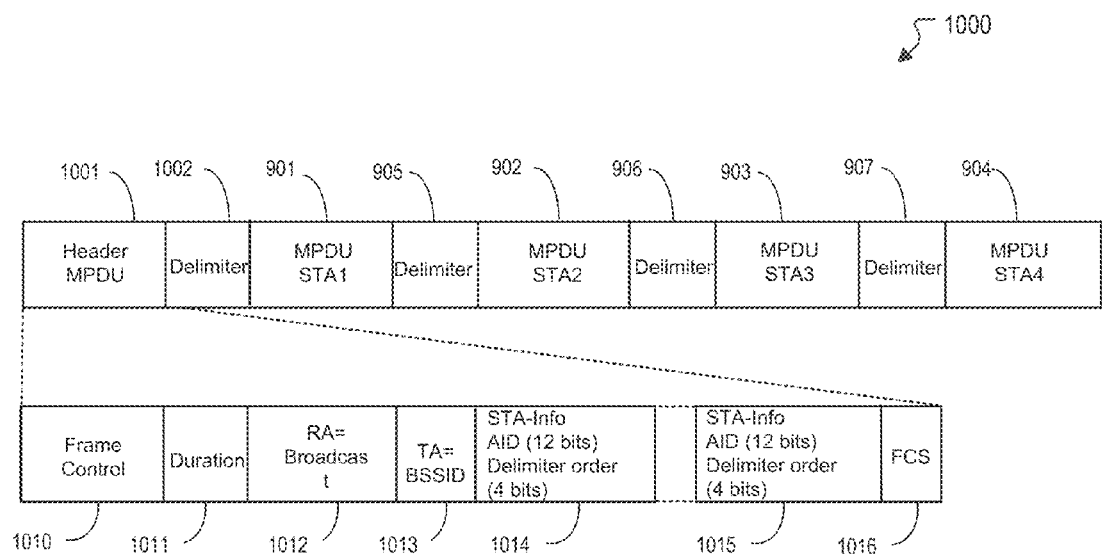
FIG. 10 illustrates an example of a second format for an MU AMPDU.

FIG. 10 illustrates an example of a second format for an MU AMPDU 1000. This example describes the second method and format to aggregate several MPDUs into a DL PPDU destined to several STAs. In this method, the MPDUs are aggregated in the same way as in the first method (see FIG. 9). However, a new "Header MPDU" 1001 followed by a delimiter 1002 is added at the beginning of all the aggregated MPDUs as shown in FIG. 10, where the fields within the Header MPDU are shown as well. The Header MPDU has the following fields: Frame Control 1010, Duration 1011, RA 1012, TA 1013 and several STA-Info (e.g., 1014, 1015) where each STA-Info is a two-byte field.

Since each MPDU has a MAC header, all the fields and subfields of the MAC header of each MPDU is set independently (and as if each MPDU is carried in a separate PPDU). The following shows the setting of MAC header fields in "Header MPDU" 1001 in an MU AMPDU:

1) The address fields in Header MPDU 1001 are RA 1012 and TA 1013 where RA 1012 is set to Broadcast address, and TA 1013 is set to the MAC address of the AP. In another embodiment, the RA subfield 1012 of the header MPDU may be set to a group-address that represents the group of the STAs that are the recipient of the MU AMPDU frame.
2) The Type subfield in the Frame Control 1010 of the Header MPDU 1001 is set to either Management (00), Control (01) or Data (10) types.
3) The Sub-type subfield in the Frame Control 1010 of the Header MPDU 1001 is set to a new sub-type such as sub-type Data_MUAMPDU or Control_MUAMPDU or Management_MUAMPDU.
4) The following sub-fields in the Frame Control 1010 of the Header MPDU 1001 are reserved: To DS, From DS, More Flag, Retry, Power Management, More Data, Protected flag, and Order.
5) The Duration field 1011 (when is less than 32768, i.e. high order bit not set) indicates the duration in microseconds and used to update the network allocation vector (NAV). This field in the "Header MPDU" 1001 is not used to indicate the association identifier (AID). Note that the value that is indicated in the Duration field 1011 of "Header MPDU" 1001 is the same value of the Duration field in each MPDU in the MU AMPU (whenever the Duration filed indicates the NAV value, but not the AID).
6) The 2-byte STA Info (e.g., 1014, 1015) in Header MPDU 1001 is set as follows: AID (12 bits)+Delimiter order (4 bits), where the delimiter order is the index of the delimiter as it appears in the MU AMPDU. In other embodiments, a shorter version of AID such as Partial AID (9 bits) may be used in the Header MPDU 1001. In other embodiments, even a shorter version of AID (SAID) is used where when added to the Delimiter order, they become in total one byte. Examples are: Short AID (5 bits) and Delimiter order (3 bits).

Accordingly, the Header MPDU 1001 may include a common information field (e.g., 1010, 1111, 1012, 1013) and multiple per user information fields (e.g., STA-Info fields 1014 and 1015). A common information field may be common to a set of STAs, and a per user information field (or each per user information field) may be specific to a corresponding STA. As an MU AMPDU is a payload of a DL PPDU, the Header MPDU 1001 may be located in a payload section of a DL PPDU or a DL frame. In an embodiment where the Header MPDU 1001 includes a common information field and multiple per user information fields, the Header MPDU 1001 may cause the set of STAs to send a response frame after the DL frame that carries the Header MPDU, where in another embodiment, the type or specifics of such response frame might be indicated in a subfield within the common information field of the Header MPDU.

Upon receiving an MU AMPDU, the PHY layer of each recipient STA decodes the whole PSDU in order to extract their MPDU. The subsequent processing may differ depending on the aggregation methods described above.

In the first method (as shown in FIG. 9 with the following details), the receiver of each STA reads each MPDU and verifies whether the RA address of the MPDU matches its MAC address, and if the MPDU does not belong to the STA, the receiver then moves to the next MPDU until it reaches the last MPDU.

In the second method (as shown in FIG. 10 with the following details), the receiver of each STA reads the "Header MPDU" 1001 first and verifies whether any of the STA-Info (e.g., 1014, 1015) has the AID or PAID or SAID that matches its own. If the STA does not find any STA-Info that matches its own AID/PAID/SAID, then it does not process the rest of the MU AMPDU. However, the Duration 1011 value in the "Header MPDU" 1001 is used to update the NAV value. If the STA finds one or more STA-Info with AID/PAID/SAID similar to its own, the STA reads the Delimiter Order sub-field of those STA-Info fields (e.g., 1014, 1015), and then moves to the same order of delimiters as indicated in the STA-Info fields. Such processing is referred to as fast-forward to the MPDU that is intended for the STA, and processes each MPDU accordingly. Note that a STA may be the recipient of several MPDUs, hence may fast-forward to several MPDUs. Also note that due to the likelihood of an error, each STA even though it fast-forwards to the MPDU whose delimiter order is indicated in the STA-Info, would need to verify that its MAC address matches the RA address field of the MPDU. If it does not match, then it would not process the MPDU as its own MPDU. If such event happens, then the STA may start from the beginning, detect each delimiter, and then process the MPDU to find out whether the MPDU belongs to the STA.

An application of the MU AMPDU is to aggregate control frames. This special frame is named MU Control Wrapper frame. Such frame is useful when the AP wants to send multiple control frames, whether the same type or not, to multiple STAs as a consequence of prior frame exchanges, hence a frame wrapper that wraps these control frames becomes useful.

One format for MU Control Wrapper frame is the first format that was described above (see FIG. 9). Another format for MU Control Wrapper frame is the second format that was described above (see FIG. 10). While the first and second formats are general, it is possible to define more concise formats by avoiding repetition of some of the fields in the MAC header of each control frame.

One example for MU Control Wrapper frame is "ACK/BA MU Control Wrapper" where an AP aggregates multiple ACK or BA (BlockAck) frames into a single PPDU. To do so, either Format one (see FIG. 9) or Format two (see FIG. 10) that were described above may be used. Note that an AP may aggregate ACK frame for one STA with a BA frame to another STA. One restriction of "ACK/BA MU Control Wrapper" is that there would be either one ACK or one BA for a STA in an "ACK/BA MU Control Wrapper." The "ACK/BA MU Control Wrapper" may be used after an UL OFDMA or UL MU MIMO frame sent by multiple STAs to an AP, where the AP (that is the recipient of UL OFDMA or UL MU MIMO frame) would then aggregate the ACK or BA frames for the STAs in a single frame. Note that the AP may then put the "ACK/BA MU Control Wrapper" frame in a legacy format such as HT or VHT formats or in HE OFDM format.

Another example for MU Control Wrapper frame is "BAR MU Control Wrapper" where an AP aggregates multiple BAR (BlockAck Request) frames into a single PPDU. To do so, either Format one (see FIG. 9) or Format two (see FIG. 10) that were described above may be used. Note that an AP may aggregate BAR frames with different types (e.g., Compressed BAR). The "BAR MU Control Wrapper" may be used after a DL OFDMA, DL MU MIMO frame or one or more multicast frames sent to multiple STAs by an AP, where the AP would then aggregate the BAR frames for all or some of the STAs (depending on the ACK policy set for each STA) in a single frame. Note that the AP may then put the "BAR MU Control Wrapper" frame in a legacy format such as HT or VHT formats or in HE OFDM format. In one or more aspects, the term "BAR MU" may be referred to as "MU BAR" or "MU-BAR."

Another example for MU Control Wrapper frame is "Trigger MU Control Wrapper". Before describing "Trigger MU Control Wrapper," we note that a Trigger frame is a control frame where an AP instructs a STA to place its data frame (in a prescribed sub-band in an UL OFDMA PPDU or in an UL MU MIMO) after a TBD time (e.g., after short inter-frame space (SIFS) or after point coordination function (PCF) inter-frame space (PIFS)), where the AP may suggest some of the PHY attributes that the responding STAs are going to use to send the response frame. In a "Trigger MU Control Wrapper," an AP aggregates multiple Trigger frames into a single PPDU, after which the recipients of the Trigger frames would initiate an UL OFDMA or UL MU MIMO frame simultaneously. To do so, either Format one (see FIG. 9) or Format two (see FIG. 10) that was described above may be used. One restriction of "Trigger MU Control Wrapper" is that there would be one Trigger frame for a STA in a "Trigger MU Control Wrapper." The "Trigger MU Control Wrapper" may be used immediately before an UL OFDMA or an UL MU MIMO frame, and sent to multiple STAs by an AP, where the STAs would then initiate an UL OFDMA or UL MU MIMO frame simultaneously after an inter-frame space (IFS) period such as SIFS or PIFS. Note that the AP may then put the "Trigger MU Control Wrapper" frame in a legacy format such as HT or VHT formats or in HE OFDM format.

Another example for MU Control Wrapper frame is "BAR/Trigger MU Control Wrapper," where an AP aggregates multiple BAR (BlockAck Request) and Trigger frames into a single PPDU. To do so, either Format one (see FIG. 9) or Format two (see FIG. 10) that were described above may be used. Note that the AP aggregates BAR frame and Trigger frame together for each STA. One restriction of "BAR/Trigger MU Control Wrapper" is that there would be one BAR and one Trigger frame for each STA in a "BAR/Trigger MU Control Wrapper." The "BAR/Trigger MU Control Wrapper" may be used after a DL OFDMA or DL MU MIMO frame sent to multiple STAs by an AP, where the AP would then aggregate the BAR frames and Trigger frames for all or some of the STAs (depending the ACK policy set for each STA) in a single frame. Note that the AP may then put the "BAR/Trigger MU Control Wrapper" frame in a legacy format such as HT or VHT formats or in HE OFDM format.

Another example for MU Control Wrapper frame is "RTS MU Control Wrapper," where an AP aggregates multiple RTS frames into a single PPDU. To do so either Format one (see FIG. 9) or Format two (see FIG. 10) that were described above may be used. Note that the AP aggregates RTS frame and Trigger frame together for each STA. One restriction of "RTS MU Control Wrapper" is that there would be one RTS for each STA in an "RTS MU Control Wrapper." The "RTS MU Control Wrapper" may be used to initiate a protection mechanism for the immediately subsequent DL/UL OFDMA or DL/UL MU MIMO frame sent by multiple STAs to the AP. The AP starts by aggregating the RTS frames for all of the STAs in a single frame, where each STA would respond after SIFS time by a CTS frame where it gets RF-combined. To make sure RF-combination works, each STA may need to set the scrambling sequence for the CTS frame equal to the scrambling sequence obtained from the previous frame. Note that the AP may then put the "RTS MU Control Wrapper" frame in a legacy format such as HT or VHT formats or in HE OFDM format.

The above examples outlined several possibilities for MU Control Wrapper where an AP wraps multiple control frames of the same sub-type into a single MU Control Wrapper frame. However, it is possible that the AP wraps multiple control frames of different sub-types as well, such as the example of BAR/Trigger MU Control Wrapper as described above. In wrapping control frames with different sub-types destined to several STAs, the AP may evaluate the possible response of all the STAs and avoids wrapping control frames that may cause ambiguity in medium access or medium possession. In some cases, multiplexed responses may be expected from the STAs, such as the case BAR MU Control Wrapper, where it is expected that the BA or ACK frames that are sent in response would be multiplexed via e.g., UL OFDMA or UL MU MIMO. In one example, an AP sends an MU Control Wrapper that includes one or more BA frames to a first set of STAs and one or more BAR frames to a second set of STAs (along with resource unit allocation for the second set of STAs that are expected to send ACK/BA to the BAR frame sent by the AP). In another example, an AP sends an MU Control Wrapper that includes one or more ACK/BA frames to a first set of STAs and one or more RTS frames to a second set of STAs (along with resource unit allocation for the second set of STAs that are expected to send CTS frame(s) to the RTS frame sent by the AP). In this case, the CTS frame(s) might be sent in non-HT duplicate format in one or more 20 MHz sub-channels that the AP indicates. In another example, an AP sends an MU Control Wrapper that includes one or more ACK/BA frames or RTS frames to a first set of STAs and one or more UL resource allocation frames (or Trigger frames) to a second set of STAs, where the second set of STAs reply with either CTS frame with bandwidth indication. PS-Poll frame, QoS Null frame or a short data frame. The QoS Null frame may include HE-Control in the MAC header that carries Buffer size for one, multiple or all TIDs, channel quality index for full bandwidth or one or more sub-bands (resource-units).

Another application of MU AMPDU, with the Format one (see FIG. 9) or Format two (see FIG. 10) that were introduced above, is in aggregation of data frames. One example is when AP serves multiple VoWiFi streams to several STAs. Voice MPDUs are usually short and frequent, and are sent with Ack Policy set to no acknowledgment (due to the delay sensitivity that the voice has). In this application, the AP aggregates the short data frames that are destined to several STAs into a single MU AMPDU.

While above example highlights the aggregation of multiple frames from the same access category (AC), as in the above example among VO AC, it is possible that the AP performs MU AMPDU across multiple access categories. However, in performing MU AMPDU, the AP would consider fairness issues such that if an AC has won the contention, then the aggregation of data frames, possibly from other ACs, with the frame whose AC has won the contention would not make the MU AMPDU frame much longer. Therefore, the AP may restrict the aggregation inside MU AMPDU limited to the same AC type in some embodiments, and the AP may aggregate across multiple ACs with limitations on the total length of the MU AMPDU in other embodiments.

Another application of MU AMPDU, with the Format one (see FIG. 9) or Format two (see FIG. 10) that were introduced above, is in aggregation of management frames. In this application, the AP aggregates management frames that are destined to several STAs into a single MU AMPDU. The AP may attempt to send the management MU AMPDU in a robust format, e.g., a legacy format such as HT or VHT, and with a mid to low MCS.

The fields and subfields described in the above embodiments appear as a TXVECTOR parameter between MAC and PHY sub-layers in a transmitting STA (see FIG. 2). Similarly, the fields and subfields described in the above embodiments appear as a RXVECTOR parameter between MAC and PHY sub-layers in a receiving STA (see FIG. 2).

The capability to aggregate multiple MPDUs in a single PDU may be limited to some AP or STAs, hence some capability fields are described below to indicate such capability.

In HE Capabilities, a subfield denoted by MUAMPDU-Capability (1 bit) indicates whether an AP is capable of aggregating multiple MPDUs destined to several STAs. If an AP is capable of aggregating multiple PSDUs in a single sub-band it sets MUAMPDUCapability=1, otherwise it sets it to MUAMPDUCapability=0.

In some aspects, a STA indicates in the Maximum MU AMPDU Length field in its HE Capabilities element the maximum MU AMPDU length that it can receive in any PPDU format. In other aspects, a STA indicates in the Maximum number of MPDUs in MU AMPDU field in its HE Capabilities element the maximum number of MPDUs in an MU AMPDU that it can receive in any PPDU format.

In one or more aspects, a STA may not start the transmission of more than one MPDU within the time limit described in the Minimum MPDU Start Spacing field declared by the intended receiver. To satisfy this requirement, the number of octets between the start of two consecutive MPDUs in a MU AMPDU, measured at the PHY SAP, may be equal to or greater than a TBD threshold.

If necessary, in order to satisfy this requirement, a STA may add padding between MPDUs in an MU AMPDU. Any such padding may be in the form of one or more MPDU delimiters (e.g., 905-907) with the MPDU Length field set to 0.

Figure 11:
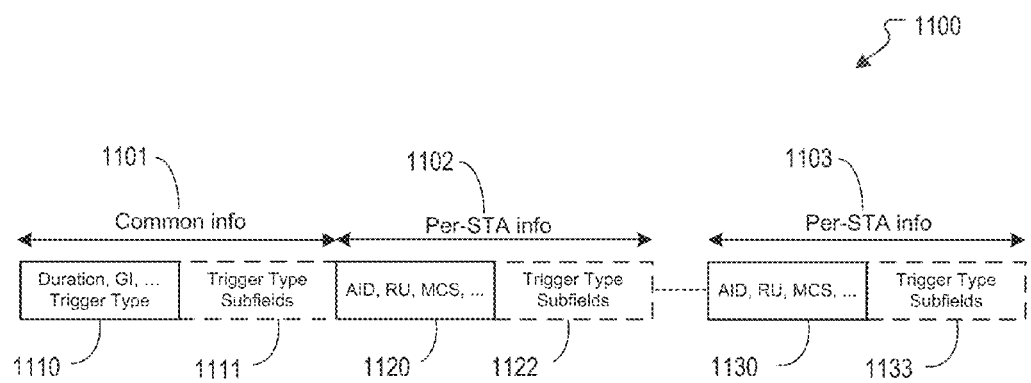
FIG. 11 illustrates a schematic diagram of an example of a sequence of fields to indicate a trigger frame structure.

FIG. 11 illustrates a schematic diagram of an example of a sequence of fields to indicate a trigger frame 1100 structure. In UL multiuser transmission, an AP sends a frame which is called a Trigger frame 1100 (sometimes referred to as a UL-Poll frame) which serves multiple purposes. First, the Trigger frame 1100 provides a reference to the STAs that are going to participate in forming the UL MU frame, which it would help to adjust some time and frequency with respect to the AP. Second, the Trigger frame 1100 lists the STAs that are expected to participate in the UL MU frame, the bandwidth and sub-bands that the STAs are going to use, and the AP specifies some PHY and MAC attributes that the STAs may follow.

The structure of the Trigger frame 1100 is as follows: (a) UL MU PPDU attributes (or "common info" part) (e.g., 1101), (b) STA PSDU attributes (or "per-STA info" part) (e.g., 1102, 1103). In the "UL MU PPDU attributes," the attributes of the UL MU PPDU that follows the Trigger frame is indicated. In the "STA PSDU attributes," the attributes of the PSDU of a STA within the UL MU PPDU is described. Note that there would be one "STA PSDU attributes" per each STA that is expected to participate in forming the UL MU PPDU. In the present disclosure, the structure of Trigger frame 1100 is detailed so that some various types of Trigger frames with various intention can be designed.

The UL MU PPDU attributes or the common info part (e.g., 1101) has a sub-field that is denoted as Type (e.g., 1110). This field indicates the purpose of the Trigger frame 1100, or the type of the response that the Trigger frame seeks. For instance, various "MU Control Wrapper" frames described above (e.g. RTS MU Control Wrapper, BAR MU Control Wrapper, . . . ) each is a specific type of the MU Control Wrapper frame identified by a similar Type subfield in Header MPDU 1001. In another instance, the Type sub-field 1110 may indicate that the Trigger frame 1100 contains Block Acknowledgment Request or BAR frame for the STAs that are identified in the "STA PPDU attributes" part of the per-STA info part (e.g., 1102, 1103). In another instance, the Type sub-field 1110 may indicate that the Trigger frame 1100 contains GCR Block Acknowledgment Request or GCR-BAR frame for the STAs that are identified in the "STA PPDU attributes" part of the per-STA info part (e.g., 1102, 1103). In another instance, the Type sub-field 1110 may indicate that the Trigger frame 1100 contains Multicast Block Acknowledgment Request or MC-BAR frame for the STAs that are identified in the "STA PPDU attributes" part of the per-STA info part (e.g., 1102, 1103). In one example, the Type sub-field 1110 may indicate that the Trigger frame 1100 contains a combination of control frames such as one or more ACK/BA frames to a first set of STAs and one or more BAR frames to a second set of STAs (along with some indication in the Common-Info regarding which Per-STA Info carries the ACK/BA content and which carries the BAR content). In another example, the Type sub-field 1110 may indicate that the Trigger frame 1100 contains a combination of control frames such as one or more ACK/BA frames to a first set of STAs and one or more RTS frames to a second set of STAs (along with some indication in the Common-Info regarding which Per-STA Info carries the BA content and which carries the RTS content, and possibly with indication for the second set of STAs regarding whether the CTS frame(s) should be sent in non-HT duplicate format in one or more 20 MHz sub-channels). In another example, the Type sub-field 1110 may indicate that the Trigger frame 1100 contains a combination of control frames such as one or more ACK/BA frames or RTS frames to a first set of STAs and one or more UL resource allocation frames (or basic Trigger frames) to a second set of STAs, where the second set of STAs reply with either CTS frame with bandwidth indication, PS-Poll frame, QoS Null frame or a short data frame. The QoS Null frame may include HE-Control in the MAC header that carries Buffer size for one, multiple or all TIDs, channel quality index for full bandwidth or one or more sub-bands (re-source-units).

The presence of the Type sub-field (e.g., 1110) in a Trigger frame 1100 would indicate whether and what additional sub-fields exist in the common info part (e.g., 1110) and per-STA info part (e.g., 1102, 1103). Therefore, in the instances mentioned above, the Trigger sub-type would indicate whether there are "Trigger-type sub-fields" (e.g., 1111, 1122, 1133) within the common-info part (e.g., 1101) and per-STA info part (e.g., 1102, 1103). Note that in some instances, only the common info part (e.g., 1101) would have a "Trigger-type sub-field" (e.g., 1111) and the per-STA info part (e.g., 1102, 1103) may or may not have "Trigger-type sub-fields." In the following, distinctions are made regarding each embodiment and whether they have "Trigger-type sub-fields" within per-STA info part or not.

In one embodiment, the Type sub-field (e.g., 1110) in a Trigger frame 1100 indicate MU BAR or Multi-STA BAR. Due to such type indication, the common info part (e.g., 1101) would have a Trigger-type sub-field (e.g., 1111), which is denoted as BAR Control. In some embodiments, where a BAR Control subfield is expected for multiple TIDs for a single STA, the BAR Control is present in the Trigger Type Subfields (e.g., 1122, 1133) within each Per-STA info). The BAR Control has length of two octets and includes: BAR ACK Policy, Multi-TID, Compressed Bitmap, GCR, and TID-Info. In some embodiments, however, fields like BAR ACK Policy and Multi-TID and TID-Info would have reserved values, or may not be present at all (hence the length of BAR Control would be shorter). The per-STA info part (e.g., 1102, 1103) of the Trigger frame 1100 would have a Trigger-type sub-field (e.g., 1122, 1133) that is denoted as BAR Info. The BAR info has one bit that indicates whether a BA frame or ACK frame is requested. After this bit, and in case a BA is requested, BA Starting Sequence Control (2 octets) follows (and if ACK response is sought BA Starting Sequence Control is not present). An AP that seeks BA or ACK frames from multiple STAs to be within an UL MU PPDU would use such specific Trigger frame and sets the Type sub-field (e.g., 1110) to MU BAR and adds the above-mentioned Trigger-type sub-field (e.g., 1111). A STA that receives a Trigger frame 1100 with the Type sub-field 1110 set to MU BAR, would check whether there is any per-STA info part (e.g., 1102, 1103) that carries the same identification (such as AID or PAID) that the STA is identified with, and if there is then the STA reads the common-info part (e.g., 1101) and the relevant per-STA info part (e.g., one of 1102, 1103), and prepares an ACK or BA frame according to these fields and the sub-field that is present due to the type (e.g., 1110) being MU BAR. The STA then participates in the immediately following UL MU PPDU and places its ACK or BA frame according to the resources that is assigned to the STA (and indicated within the per-STA info part).

To seek BA/ACK responses from several multicast STAs (that are associated with a GCR service), one choice is to use a Trigger frame (e.g., 1100) and add appropriate Trigger Type sub-fields (e.g., 1111, 1122, 1133). In one embodiment, the Type sub-field 1110 in a Trigger frame 1100 indicates GCR-based MC BAR. The common info part 1101 for such type of Trigger frame includes BAR Control, BA Starting Sequence Control and GCR Group Address. The BAR Control (2 octets) is present for sake of similarity with SU BAR and in some embodiments may not be present. The BA Starting Sequence Control (2 octets) is the same for all STAs in a multicast service period, and GCR Group Address (6 octets) is a group address for the GCR-capable devices in a GCR service period (in other words, the GCR group address (GA) is the MAC address of the GCR group for a GCR service period). Note that there is no additional sub-fields in the per-STA info that are specifically related to MC BAR. In some embodiments, the per-STA info part (e.g., 1102, 1103) may not have an AID or PAID and the STAs receiving such Trigger frame rely on the GCR group address and the order of the STA position in the GCR group. An AP that seeks BA or ACK frames from multiple STAs (that are participating in a GCR service) to be within an UL MU PPDU would use such specific Trigger frame, sets the Type sub-field to GCR-based MC BAR, and adds the above-mentioned Trigger-type sub-field. A STA that receives a Trigger frame (e.g., 1100) with the Type sub-field (e.g., 1110) set to GCR-based MC BAR, would check whether the GCR Group Address is one the group addresses that the STA is associated with. Also, the STA checks if there is any per-STA info part (e.g., 1102, 1103) that carries the same identification (such as AID or PAID) that the STA is identified with. If there is, then the STA reads the common-info part 1101 and the relevant per-STA info part (e.g., 1102, 1103), and prepares a BA frame according to these fields and the sub-field that is present due to the type being GCR-based MC BAR. The STA then participates in the immediately following UL MU PPDU, and places its BA frame according to the resources that is assigned to the STA (and indicated within the per-STA info part).

In other embodiments, a Trigger frame is used to send ADDBA or DELBA frames (see FIG. 5) to a set of STAs that participate in a GCR service. The GCR originator establishes or tears down BA agreement between GCR recipients (which requires exchange of ADDBA Request/Response or DELBA). In a GCR service, ADDBA/DELBA frames have the same content for all the GCR-participants. However, the AP (i.e. the GCR originator) needs individual ADDBA Responses from the STAs. This would make a single ADDBA and DELBA content for all STAs and assigns each STA an RU to respond within a joint UL MU frame. In such embodiments, the Type sub-field in the Trigger frame indicate GCR ADDBA or GCR DELBA. The common info part (e.g., 1101) for such type of Trigger frame (e.g., 1100) includes the content of ADDBA or DELBA frame. Note that there is no additional sub-fields in the per-STA info (e.g., 1102, 1103) that are specifically related to GCR ADDBA or GCR DELBA.

In another embodiment, a GCR originator may alternatively use a Trigger frame (e.g., 1100) with a generic Type (e.g., 1110) and send the Trigger frame within a PPDU that also includes a ADDBA or DELBA frame with appropriate fields such as GCR Group Address. In some embodiments, the PPDU includes at least one frame where one of the frames (or the first frame) is the ADDBA or DELBA frame with appropriate GCR Group Address and the next or second frame is a Trigger frame with generic type, which has the per-STA info for some or all of the STAs that are associated with the GCR Group Address specified in the ADDBA or DELBA frame. A HE STA that receives such set of frames would check if the GCR Group Address specified in the ADDBA or DELBA frame is one of the GCR Group Addresses that is associated with, and if so, may check all the per-STA info sub-fields of the Trigger frame. If there is a per-STA info sub-field that has AID or PAID with the same value as that of the STA, then the STA takes appropriate action based on the content of ADDBA or DELBA frame, and uses the information in the Trigger frame to participate in the UL MU frame that immediately follows.

To seek BA/ACK responses from several multicast STAs, one choice is to use a Trigger frame and add appropriate Trigger Type sub-fields (e.g., 1111, 1122, 1133). In one embodiment, the Type sub-field (e.g., 1110) in a Trigger frame may indicate Multicast (MC) BAR. The common info part (e.g., 1101) for such type of Trigger frame includes BAR Control (e.g., 605 of FIG. 6A) and BA Starting Sequence Control (e.g., 607 of FIG. 6A). The BAR Control (2 octets) is present for sake of similarity with SU BAR and in some embodiments may not be present. The BA Starting Sequence Control (2 octets) is the same for all STAs in a multicast service period. Note that there is no additional sub-fields in the per-STA info that are specifically related to MC BAR. An AP that seeks BA or ACK frames from multiple STAs (that are participating in a multicast service) to be within an UL MU PPDU would use such specific Trigger frame and sets the Type sub-field 1110 to MC BAR and adds the above-mentioned Trigger-type sub-field (e.g., 1111, 1122, 1133). A STA that receives a Trigger frame with the Type sub-field (e.g., 1110) set to MC BAR would check whether there is any per-STA info part (e.g., 1102, 1103) that carries the same identification (such as AID or PAID) that the STA is identified with, and if there is then the STA reads the common-info part (e.g., 1101) and the relevant per-STA info part (e.g., 1102, 1103), and prepares a BA frame according to these fields and the sub-field that is present due to the type being MC BAR. The STA then participates in the immediately following UL MU PPDU and places its BA frame according to the resources that is assigned to the STA (and indicated within the per-STA info part).

In other embodiments, a Trigger frame is used to send ADDBA or DELBA frame to a set of STAs that participate in a multicast service. The multicast originator which is an AP establishes or tears down BA agreement between the STAs (which requires exchange of ADDBA Request/Response or DELBA). In such multicast service, ADDBA/DELBA frames have the same content for all the multicast-participants. However, the AP needs individual ADDBA Responses from the STAs. This would make a single ADDBA and DELBA content for all STAs. In the case of ADDBA and DELBA, within the Trigger frame, the AP assigns each STA an RU to respond within a joint UL MU frame. In such embodiments, the Type sub-field (e.g., 1110) in the Trigger frame indicate MC ADDBA or MC DELBA. The common info part (e.g., 1101) for such type of Trigger frame includes the content of ADDBA or DELBA frame. Note that there is no additional sub-fields in the per-STA info that are specifically related to MC ADDBA or MC DELBA. In another embodiment, an AP may alternatively use a Trigger frame with a generic Type and send the Trigger frame within a PPDU that also includes a ADDBA or DELBA frame with appropriate fields (note that the RA field of ADDBA or DELBA may be set to Broadcast address or to a reserved value). I.e. the PPDU includes at least frame where one of the frames (or the first frame) is the ADDBA or DELBA frame and the next or second frame is a Trigger frame with generic type which has the per-STA info for the STAs that ADDBA Response or DEL BA Response frame are requested. A HE STA that receives such set of frames would check if the RA of the ADDBA or DELBA frame has a matching address with the address of the STA, or if it a Broadcast address or if it is a given reserved value. The HE STA may also check the content of the Trigger frame. If any of the per-STA info sub-fields of the Trigger frame has an AID or PAID with the same value as that of the STA, then the STA takes appropriate action based on the content of ADDBA or DELBA frame, and uses the information in the Trigger frame to participate in the UL MU frame that immediately follows.

In the above embodiments, the MU BAR frame can be used to poll ACK or BA frames from a set of STAs that have previously received a payload from a STA, e.g., an AP, regardless of whether the previously sent frames were unicast frames or a multicast frames, or whether the frames were sent within a SU PPDU or a MU PPDU. For instance, an AP may send a MU BAR frame with any of the above-listed formats, to poll ACK/BA frames from a set of STAs that have received their payload in one or more previous DL MU frames. Within the same MU BAR frame, the AP polls ACK/BA frames from the set of STAs that have received their payload multiple previous DL SU frames. In other aspects, an AP may send a MU BAR frame with any of the above-listed formats, to poll ACK/BA frames from a set of STAs that have received their payload in one or more previous unicast frames (whether in a DL MU or DL SU PPDU formats). Within the same MU BAR frame, the AP polls ACK/BA frames from the set of STAs that have received their payload within one or multiple previous multicast frames. In the embodiments related to GCR service, there is an indication for each STA that is the recipient of the MU BAR to know whether the GCR indicator applies to them or not.

It is possible that the MU BAR frame and GCR-based MC BAR are identified with a single value in the Trigger Type (TT) subfield (e.g., 1110) and instead a GCR indication would indicate whether the MU BAR frame is associated with any MC/GCR service or not. For instance, consider that a sub-field GCR Indication (1-bit, in a Common Info field 1101 of a Trigger frame 1100) is used to indicate whether the MU BAR frame (a variant of the Trigger frame) is regarding a multicast/GCR service (GCR Indication enabled) or not (GCR Indication disabled). The GCR Indication may be part of the Common Info field (e.g., 1101), but not a Trigger-dependent Common Info field (e.g., 1111). In some embodiments, for GCR MU BAR frames the GCR group address may appear in the RA field of the Trigger frame GCR MU BAR variant. In some embodiments, for MU BAR frames a group address (where a group of STAs is identified with) may appear in the RA field of the Trigger frame MU BAR variant. In some embodiments, for Trigger frames a group address may appear in the RA field of the Trigger frame to identify a group of STAs that are associated with the same BSSID, or a group of STAs that are associated with a AP that has multiple BSSIDs.

In one embodiment, if the Trigger frame 1100 is an MU-BAR variant, then the Trigger-dependent Common Info field (e.g., 1111) is defined as: GCR Address (present if GCR Indication is enabled, otherwise is not present), BAR Control (present if GCR Indication is disabled, otherwise is not present). If the Trigger frame is an MU-BAR variant, then a Trigger-dependent Per User Info field (e.g., 1122, 1133) is defined as: BAR Information. Note that GCR Address is also known as GCR Group Address. The GCR Indication may be part of the Common Info field (e.g., 1101), but not the Trigger-dependent Common Info field (e.g., 1111).

In another embodiment, the Trigger frame is an MU-BAR variant and has GCR Indication subfield within the common info field (e.g., 1101), and the Trigger-dependent Common Info field (e.g., 1111) is defined as: GCR Address (present if GCR Indication is enabled, otherwise is not present). If the Trigger frame is an MU-BAR variant, then the Trigger-dependent Per User Info field (e.g., 1122, 1133) is defined as: BAR Control, BAR Information. The GCR Indication may be part of the Common Info field, but not the Trigger-dependent Common Info field.

In another embodiment, the Trigger frame is an MU-BAR variant and has GCR Indication and Multi-TID indication subfields within the common info field, and the Trigger-dependent Common Info field (e.g., 1111) is defined as: GCR Address (present if GCR Indication is enabled, otherwise is not present), BAR Control (present if GCR Indication is enabled or Multi-TID is disabled, otherwise is not present). If the Trigger frame is an MU-BAR variant, then the Trigger-dependent Per User Info field (e.g., 1122, 1133) is defined as: BAR Control (present if GCR Indication is disabled and Multi-TID is enabled, otherwise is not present), BAR Information. The GCR Indication and/or Multi-TID indication may be part of the Common Info field, but not the Trigger-dependent Common Info field.

In another embodiment, when the Trigger frame is an MU-BAR variant, there exist a multi-bit GCR Indication where it functions as follows. A given value of an indication field in a Trigger frame, e.g., GCR Indication, indicates that the MU BAR Trigger frame is not associated with a GCR service (and subsequently, there may be no GCR Address in the remaining of the Common Info field). Another given value of the GCR Indication (e.g., 01) indicates that the MU BAR Trigger frame is associated with a GCR service (and subsequently, there may be a GCR Address in the remaining of the Common Info field, or in the Trigger-dependent Common Info field). Another given value of GCR Indication (e.g., 10) indicates that the Trigger frame is associated with a GCR service and acts as ADDBA frame for each of the STAs that are addressed in one of the Common Info fields (and subsequently, there may be a GCR Address in the remaining of the Common Info field, or in the Trigger-dependent Common Info field). Another given value of GCR Indication (e.g., 11) indicates that the Trigger frame is associated with a GCR service and acts as DELBA frame for each of the STAs that are addressed in one of the Common Info fields. In another embodiment, a given value of an indication field (e.g., GCR Indication field) indicates that the Trigger frame acts as a specific management frame (e.g., ADDBA or DELBA) for each of the STAs that are addressed in one of the Common Info fields.

In one or more aspects, a Trigger-dependent Common Info field may be referred to as a trigger-type dependent common information sub-field, a type dependent common information sub-field, or vice versa. In one or more aspects, a Trigger-dependent Per User Info field may be referred to as a trigger-type dependent per user information sub-field, a type dependent per user information sub-field, or vice versa.

Figure 12B:
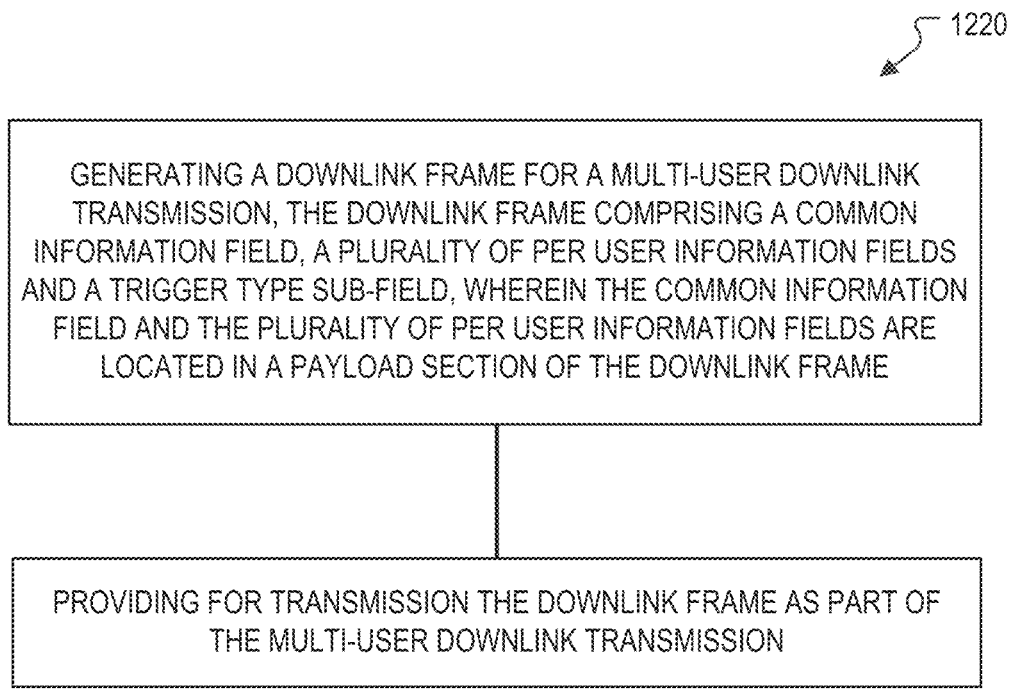
Figure 12C:
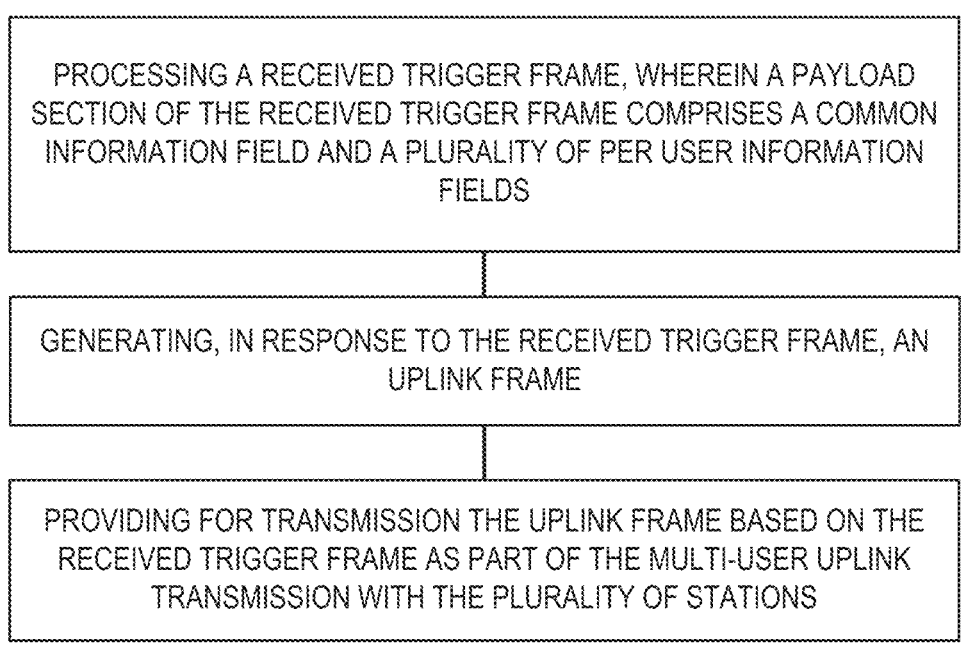

FIGS. 12A-12C illustrate flow charts of examples of multi-user aggregation methods for data and control frames. For explanatory and illustration purposes, the example processes 1210, 1220 and 1230 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290, however, the example processes 1210, 1220 and 1230 are not limited to the wireless communication devices 111-115 of FIG. 1 or their components, and the example processes 1210, 1220 and 1230 may be performed by some of the devices shown in FIG. 1, or other devices or components. Further for explanatory and illustration purposes, the blocks of the example processes 1210, 1220 and 1230 are described herein as occurring in serial or linearly. However, multiple blocks of the example processes 1210, 1220 and 1230 may occur in parallel. In addition, the blocks of the example processes 1210, 1220 and 1230 need not be performed in the order shown and/or one or more of the blocks/actions of the example processes 1210, 1220 and 1230 need not be performed. Various examples of aspects of the disclosure are described below as clauses for convenience. These are provided as examples, and do not limit the subject technology. As an example, some of the clauses described below are illustrated in FIGS. 12A through 12C.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Clause A. A station for facilitating multi-user communication in a wireless network, the station comprising: one or more memories; and one or more processors coupled to the one or more memories, the one or more processors configured to cause: determining a common information field and a per user information field within a received downlink frame, wherein the common information field and the per user information field are located in a payload section of the received downlink frame, wherein the common information field includes information for all of a plurality of stations, and wherein the per user information field includes information specific to the station, wherein the downlink frame is for triggering a multi-user uplink transmission with the plurality of stations, and the downlink frame includes a trigger type sub-field; generating a multi-user uplink frame based on the common information field and the per user information field; and transmitting the multi-user uplink frame based on the downlink frame as part of the multi-user uplink transmission with the plurality of stations.

Clause B. A non-transitory computer-readable storage medium storing computer-executable instructions that, when executed by one or more processors, cause one or more processors to perform operations, the operations comprising: generating a downlink frame for a multi-user downlink transmission, the downlink frame comprising a common information field, a plurality of per user information fields and a trigger type sub-field, wherein the common information field and the plurality of per user information fields are located in a payload section of the downlink frame, wherein the common information field includes information for all of a plurality of stations, wherein one of the plurality of per user information fields includes information specific to one of the plurality of stations, wherein the downlink frame is for triggering a multi-user uplink transmission with the plurality of stations; and providing for transmission the downlink frame as part of the multi-user downlink transmission.

Clause C. A computer-implemented method of facilitating multi-user communication in a wireless network, the method comprising: processing a received trigger frame, wherein a payload section of the received trigger frame comprises a common information field and a plurality of per user information fields, wherein the common information field includes information for all of a plurality of stations, wherein each of the plurality of per user information fields includes information specific to the associated one of the plurality of stations, wherein the received trigger frame is for triggering a multi-user uplink transmission with the plurality of stations, and the received trigger frame includes a trigger type sub-field, generating, in response to the received trigger frame, an uplink frame, the uplink frame being generated based on the common information field and one of the plurality of per user information fields; and providing for transmission the uplink frame based on the received trigger frame as part of the multi-user uplink transmission with the plurality of stations.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A station for facilitating multi-user communication in a wireless network, the station comprising:
   one or more memories; and
   one or more processors coupled to the one or more memories, the one or more processors configured to cause:
   determining a common information field and a per user information field within a received downlink frame, wherein the common information field and the per user information field are located in a payload section of the received downlink frame, wherein the common information field includes information for all of a plurality of stations, and wherein the per user information field includes information specific to the station, wherein the downlink frame is for triggering a multi-user uplink transmission with the plurality of stations, and the downlink frame includes a trigger type sub-field;
   generating a multi-user uplink frame based on the common information field and the per user information field; and
   transmitting the multi-user uplink frame based on the downlink frame as part of the multi-user uplink transmission with the plurality of stations,
   wherein the received downlink frame is a multi-user block acknowledgment request (MU BAR) frame having an identification that identifies the station, and wherein the one or more processors are configured to cause providing, for transmission, a block acknowledgment (BA) frame in an indicated resource unit.

2. The station of claim 1, wherein the one or more processors are further configured to cause:
   processing the received downlink frame;
   identifying one or more padding bits following the per user information field; and
   skipping the identified one or more padding bits from processing.

3. The station of claim 1, wherein the common information field includes the trigger type sub-field, which identifies a type of trigger frame associated with the received downlink frame.

4. The station of claim 3, wherein the trigger type sub-field indicates that the received downlink frame is a multi-user block acknowledgment request (MU BAR) frame.

5. The station of claim 1, wherein the common information field comprises a trigger-type dependent common information sub-field, which includes type-specific information based on a type of trigger frame associated with the received downlink frame.

6. The station of claim 5, wherein a trigger type sub-field is located before the trigger-type dependent common information sub-field.

7. The station of claim 5, wherein the trigger-type dependent common information sub-field includes an indication that the received downlink frame is associated with a group-cast with retry (GCR) service.

8. The station of claim 7, wherein the indication that the received downlink frame is associated with the GCR service is in the trigger-type dependent common information sub-field when the received downlink frame seeks acknowledgement of multicast data transmitted to the plurality of stations.

9. The station of claim 1, wherein the per user information field comprises a trigger-type dependent per user information sub-field, which includes type-specific information associated with the station based on a type of trigger frame identified in a trigger type sub-field of the common information field.

10. The station of claim 9, wherein the trigger-type dependent per user information sub-field includes block acknowledgment request (BAR) information when the received downlink frame seeks acknowledgment for unicast data transmitted to the station.

11. The station of claim 9, wherein the trigger-type dependent per user information sub-field includes a block acknowledgment request (BAR) control sub-field when the received downlink frame seeks acknowledgment for unicast data transmitted to the station.

12. A non-transitory computer-readable storage medium storing computer-executable instructions that, when executed by one or more processors, cause one or more processors to perform operations, the operations comprising:

generating a downlink frame for a multi-user downlink transmission, the downlink frame comprising a common information field, a plurality of per user information fields and a trigger type sub-field, wherein the common information field and the plurality of per user information fields are located in a payload section of the downlink frame, wherein the common information field includes information for all of a plurality of stations, wherein one of the plurality of per user information fields includes information specific to one of the plurality of stations, wherein the downlink frame is for triggering a multi-user uplink transmission with the plurality of stations;

providing for transmission the downlink frame as part of the multi-user downlink transmission, wherein the downlink frame is a multi-user block acknowledgment request (MU BAR) frame having an identification that identifies the one of the plurality of stations; and receiving a block acknowledgment (BA) frame in an indicated resource unit after providing the MU BAR frame.

13. The non-transitory computer-readable storage medium of claim 12, wherein the providing the downlink frame comprises providing a multi-user block acknowledgment request (MU BAR) frame for transmission to one or more of the plurality of stations associated with a group-cast with retry (GCR) group address.

14. The non-transitory computer-readable storage medium of claim 12, wherein the operations further comprise:

providing for transmission a second downlink frame before the downlink frame is provided for transmission, wherein the downlink frame is a multi-user block acknowledgment request (MU BAR) frame; and receiving a BA frame after providing the MU BAR frame.

15. The non-transitory computer-readable storage medium of claim 14, wherein the MU BAR frame is destined to one or more of the plurality of stations associated with a group-cast with retry (GCR) group.

16. The non-transitory computer-readable storage medium of claim 12, wherein generating the downlink frame comprises:

inserting one or more padding bits following one or more per user information fields of the plurality of per user information fields or following a last one of the plurality of per user information fields.

17. A computer-implemented method of facilitating multi-user communication in a wireless network, the method comprising:

processing a received trigger frame, wherein a payload section of the received trigger frame comprises a common information field and a plurality of per user information fields, wherein the common information field includes information for all of a plurality of stations, wherein each of the plurality of per user information fields includes information specific to an associated one of the plurality of stations, wherein the received trigger frame is for triggering a multi-user uplink transmission with the plurality of stations, and the received trigger frame includes a trigger type sub-field;

generating, in response to the received trigger frame, an uplink frame, the uplink frame being generated based on the common information field and one of the plurality of per user information fields; and providing, for transmission, the uplink frame based on the received trigger frame as part of the multi-user uplink transmission with the plurality of stations, wherein the received trigger frame is a multi-user block acknowledgment request (MU BAR) frame having an identification that identifies the associated one of the plurality of stations, and wherein the uplink frame is a block acknowledgment (BA) frame that is provided for transmission in an indicated resource unit.

* * * * *